(12) United States Patent
Matsumoto

(10) Patent No.: US 8,096,916 B2
(45) Date of Patent: Jan. 17, 2012

(54) SADDLE TYPE VEHICLE WITH FORWARD/REVERSE CHANGEOVER MECHANISM

(75) Inventor: Shinya Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/394,961

(22) Filed: Feb. 27, 2009

(65) Prior Publication Data

US 2009/0247342 A1 Oct. 1, 2009

(30) Foreign Application Priority Data

Mar. 31, 2008 (JP) ................................. 2008-089858

(51) Int. Cl.
*F16H 3/44* (2006.01)
(52) U.S. Cl. ........ 475/303; 475/302; 475/214; 475/317; 475/323; 475/343
(58) Field of Classification Search .................. 475/214, 475/298, 299, 302, 303, 317, 323, 343, 331; 74/52, 335, 355, 376; 180/369
See application file for complete search history.

(56) References Cited

U.S. PATENT DOCUMENTS

| | | | | |
|---|---|---|---|---|
| 3,739,658 A | * | 6/1973 | Scheiter | 475/66 |
| 4,772,247 A | * | 9/1988 | Stockton | 474/8 |
| 4,988,329 A | * | 1/1991 | Lammers | 475/337 |
| 5,713,813 A | * | 2/1998 | von Greyerz | 475/257 |
| 5,951,434 A | * | 9/1999 | Richards et al. | 475/284 |
| 6,742,618 B2 | * | 6/2004 | Schoenfelder et al. | 180/182 |
| 6,907,951 B2 | * | 6/2005 | Schoenfelder | 180/190 |
| 7,815,542 B2 | * | 10/2010 | Dec | 475/326 |

FOREIGN PATENT DOCUMENTS

| | | |
|---|---|---|
| JP | 64-56381 U | 4/1989 |
| JP | 2007-198491 A | 8/2007 |

* cited by examiner

*Primary Examiner* — Tisha Lewis
(74) *Attorney, Agent, or Firm* — Birch, Stewart, Kolasch & Birch, LLP

(57) ABSTRACT

The forward/reverse travel changeover mechanism includes a projection formed by causing an output power shaft for outputting the power from a main transmission to project to the outside of a case, a carrier rotatably supported around the projection relative to a sun gear provided rotatably integrally with the projection, a planetary gear, an internal gear held in meshing engagement with the planetary gear, an output sprocket rotatably supported integrally with the internal gear and rotatable around the projection adjacent the main transmission with respect to the sun gear, and a shifter for selectively changing over the position of the carrier and the internal gear between a forward travel position at which the carrier and the internal gear are connected against relative rotation and a reverse travel position for preventing rotation of the carrier around the projection, and is disposed outside the main transmission case.

20 Claims, 14 Drawing Sheets

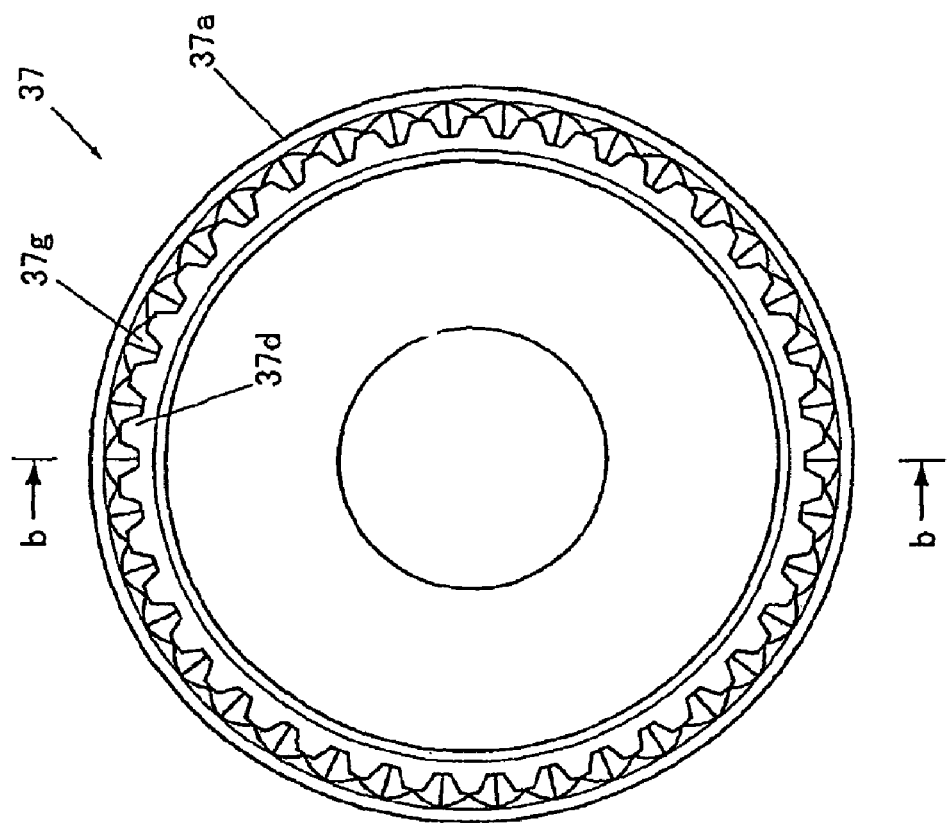
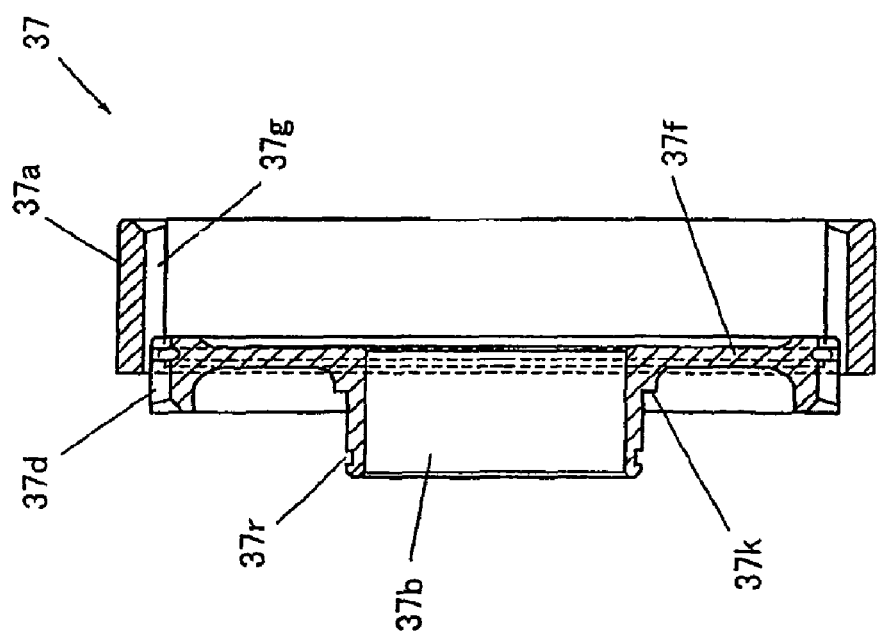
FIG. 7(a)
FIG. 7(b)

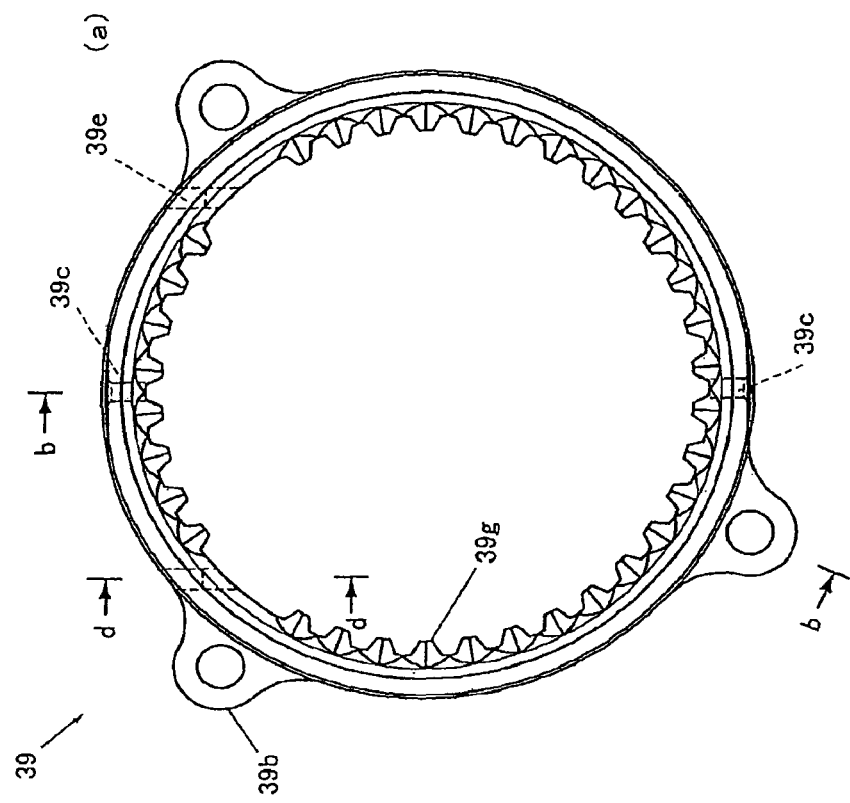
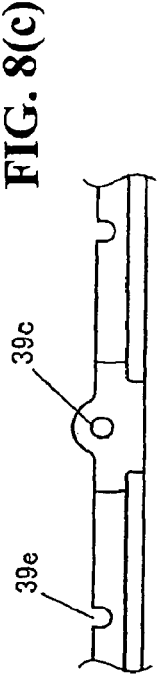
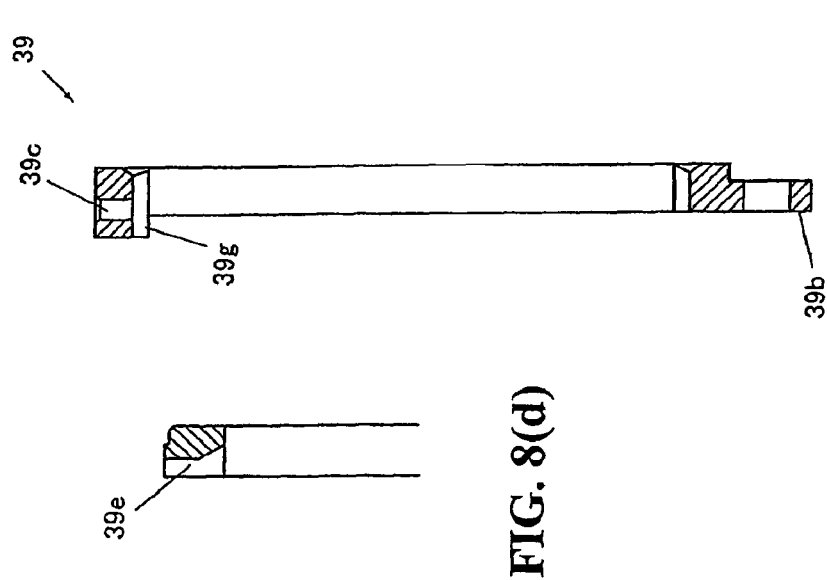
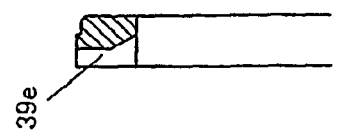
FIG. 8(a)
FIG. 8(b)
FIG. 8(c)
FIG. 8(d)

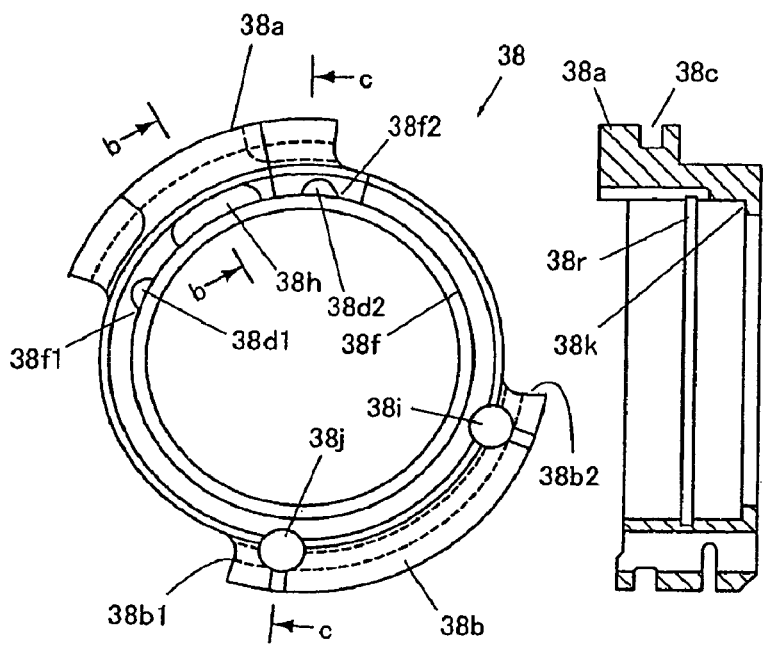
FIG. 9(a)
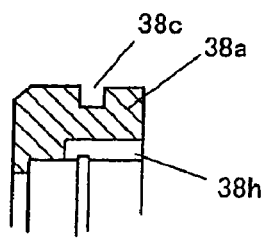
FIG. 9(b)
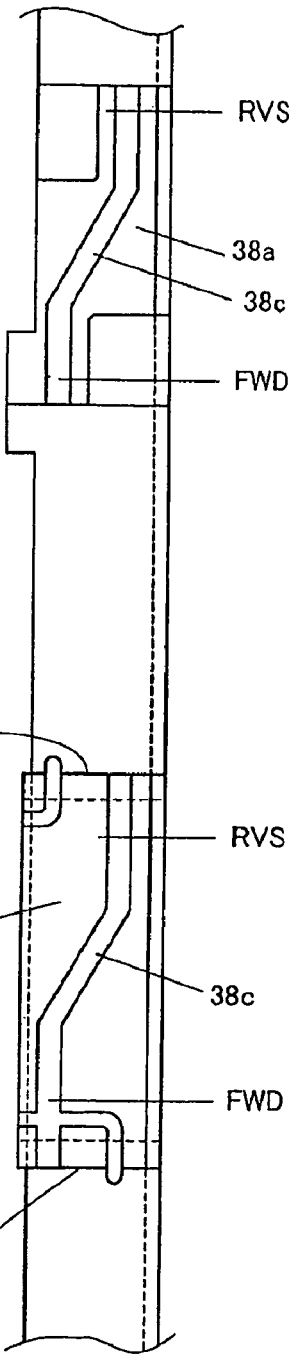
FIG. 9(c)
FIG. 9(d)

FIG. 10(c)   FIG. 10(a)   FIG. 10(d)

SADDLE TYPE VEHICLE WITH FORWARD/REVERSE CHANGEOVER MECHANISM

CROSS-REFERENCE TO RELATED APPLICATIONS

The present application claims priority under 35 USC 119 to Japanese Patent Application No. 2008-089858 filed on Mar. 31, 2008 the entire contents of which are hereby incorporated by reference.

BACKGROUND OF THE INVENTION

1. Field of the Invention

This invention relates to a saddle type vehicle with a forward/reverse travel changeover mechanism. The present invention relates to a saddle type vehicle which is operated by a driver seated on a seat such as, for example, a motorcycle, a motor three-wheeler or a motor four-wheeler, and particularly to a vehicle having a forward/reverse travel changeover mechanism.

2. Description of Background Art

Conventionally, with respect to a saddle type vehicle with a forward/reverse travel changeover mechanism, a vehicle is known wherein a driving wheel and an engine for driving the driving wheel are mounted on a vehicle body frame and a seat for a driver is disposed above the engine. See, for example, Japanese Utility Model Laid-open No. Sho 64-56381. The engine has a main transmission for changing the speed of power from the engine and for transmitting the power of the changed speed to the driving wheel and a forward/reverse travel changeover mechanism capable of changing the direction of the power from the main transmission and transmitting the power of the changed direction.

In addition, as a forward/reverse rotation changeover mechanism, a mechanism which achieves a reduction in size, is compact and includes a reduction in the weight of a forward/reverse rotation changeover apparatus is conventionally known as disclosed, for example, in Japanese Patent Laid-open No. 2007-198491. In the mechanism, a sun gear is fixed to an input power shaft driven to rotate in one direction, and a first pinion and a second pinion are incorporated between the sun gear and a ring gear. Further, a carrier for rotatably supporting the first pinion and the second pinion is integrated with an output power shaft, and the ring gear and the carrier are coupled to each other by a clutch to rotate the output power shaft in the same direction. On the other hand, the ring gear and a housing are coupled to each other by the clutch to rotate the output power shaft in the opposite direction to that of the input power shaft. Further, a mating clutch is used as the clutch for changing over the direction of rotation.

The conventional saddle type vehicle with a forward/reverse travel changeover mechanism described above has a problem since the output power shaft of the forward/reverse travel changeover mechanism is disposed in parallel to the input power shaft. Thus, the forward/reverse travel changeover mechanism has an increased size.

Further, since, in the conventional forward/reverse rotation changeover mechanism described hereinabove, the output power shaft is disposed on an extension of the input power shaft, there is a subject that, where the forward/reverse rotation changeover mechanism is connected to the main transmission of the engine of the saddle type vehicle, a support structure for the output power shaft to which an output sprocket (driving sprocket) is to be attached, upon which the load from the engine and the driving wheel act, is complicated and increased in size.

SUMMARY AND OBJECTS OF THE INVENTION

It is an object of an embodiment of the present invention to provide a saddle type vehicle with a forward/reverse travel changeover mechanism which solves the problems described above and wherein the support structure for an output sprocket can be simplified and a forward/reverse travel changeover mechanism can be reduced in size.

In order to attain the object described above, according to an embodiment of the present invention, there is provided a saddle type vehicle with a forward/reverse travel changeover mechanism wherein a driving wheel and an engine for driving the driving wheel through a sprocket are mounted on a vehicle body frame and a seat for a driver is disposed above the engine.

The engine includes a main transmission for changing the speed of power from the engine and transmitting the power of the changed speed to the driving wheel and a forward/reverse travel changeover mechanism capable of converting the direction of the power from the main transmission and transmitting the power of the changed direction.

The forward/reverse travel changeover mechanism includes a projection formed by causing an output power shaft for outputting the power from the main transmission to project to the outside of a main transmission case of the engine. A sun gear is provided on the projection for rotating integrally with the projection with a carrier rotatably supported relative to the sun gear around the projection. A planetary gear is self-rotatably supported on the carrier and rotatably mating with the sun gear. An internal gear is rotatably supported relative to the projection around the projection and is meting with the planetary gear. An output sprocket is rotatably supported integrally with the internal gear by the internal gear, which rotates around the projection adjacent to the main transmission with respect to the sun gear. A shifter is provided for selectively changing over the position of the carrier and the internal gear between a forward travel position at which the carrier and the internal gear are connected against relative rotation and a reverse travel position for preventing rotation of the carrier around the projection. The forward/reverse travel changeover mechanism is disposed outside the main transmission case.

With such a saddle type vehicle with a forward/reverse travel changeover mechanism as described above, since the forward/reverse travel changeover mechanism can be formed without providing a shaft different from the projection of the output power shaft, the forward/reverse travel changeover mechanism itself can be reduced in size. As a result, the entire engine having the forward/reverse travel changeover mechanism can be reduced in size.

Further, since the output sprocket is rotatably supported integrally by the internal gear adjacent the main transmission with respect to the sun gear, the support structure for the output sprocket can be simplified, and the forward/reverse travel changeover mechanism can be further reduced in size.

Furthermore, since such a forward/reverse travel changeover mechanism as described above is disposed outside the main transmission case, the forward/reverse travel changeover mechanism can be assembled after the main transmission is assembled to the engine. Therefore, the assembly performance is improved.

In addition, since the output sprocket is provided rotatably around the projection of the output power shaft from the main transmission adjacent to the main transmission with respect to the sun gear wheel, the necessity to change the position of the output power shaft depending upon whether or not the forward/reverse travel changeover mechanism is provided on the main transmission is eliminated.

Accordingly, the common utility of the member (engine body) on which the forward/reverse travel changeover mechanism is not provided can be improved. Accordingly, since the body section of the engine can be used commonly, for example, between a vehicle which includes the forward/reverse travel changeover mechanism and another vehicle which does not include the forward/reverse travel changeover mechanism, the productivity of such vehicles can be improved.

Preferably, the internal gear, the carrier, the shifter and a fixing member for preventing rotation of the carrier through the shifter are disposed in order toward the projecting direction of the projector, and the shifter is disposed for movement along an axial direction of the projection.

By such a configuration as just described, it becomes possible to support the shifter by means of the projection. Accordingly, the support structure for the shifter can be simplified, and the forward/reverse travel changeover mechanism can be further reduced in size.

In this instance, more preferably a boss portion is provided on the shifter and a shift drum for moving the shifter is supported rotatably on an outer periphery of the boss portion, and the fixing member is disposed on an outer periphery of the shift drum and a defining member for defining the movement of the shift drum in the axial direction is provided on the fixing member.

By such a configuration as just described, the fixing member can be used also as the defining member, and the number of parts of the forward/reverse travel changeover mechanism can be reduced.

Preferably, the sun gear is formed integrally on an outer periphery of a cylindrical member for spline fitting with the projection, and the movement of the cylindrical member and the projection in the axial direction is defined by a bolt screwed at an axial end of the projection in the cylindrical member.

By such a configuration as just described, a reduction in size of the forward/reverse travel changeover mechanism can be anticipated by an amount by which the projection of the bolt from the cylindrical member can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) and 7(b) are views showing a shifter 37, wherein 7(a) is a front elevational view and 7(b) is a sectional view taken along line b-b of FIG. 7(a);

FIGS. 8(a) to 8(d) are views showing a fixing member 39, wherein 8(a) is a front elevational view, 8(b) is a sectional view taken along line b-b of FIGS. 8(a), 8(c) is a partial plan view of FIGS. 8(a), and 8(d) is a sectional view taken along line d-d of FIG. 8(a);

FIGS. 9(a) to 9(d) are views showing a shift drum 38, wherein 9(a) is a sectional view, 9(b) is a sectional view taken along line b-b of FIGS. 9(a), 9(c) is a sectional view taken along line c-c of FIGS. 9(a), and 9(d) is a developed view of a cam face;

FIGS. 10(a) to 10(d) are views showing a link mechanism 60, wherein 10(a) is a sectional view taken along line a-a of FIG. 10(b), 10(b) is a front elevational view, 10(c) is a sectional view taken along line c-c of FIGS. 10(b), and 10(d) is a sectional view taken along line d-d of FIG. 10(b);

DETAILED DESCRIPTION OF THE PREFERRED EMBODIMENTS

In the following, an embodiment of a saddle type vehicle with a forward/reverse travel changeover mechanism according to the present invention is described with reference to the drawings.

Figure 1:
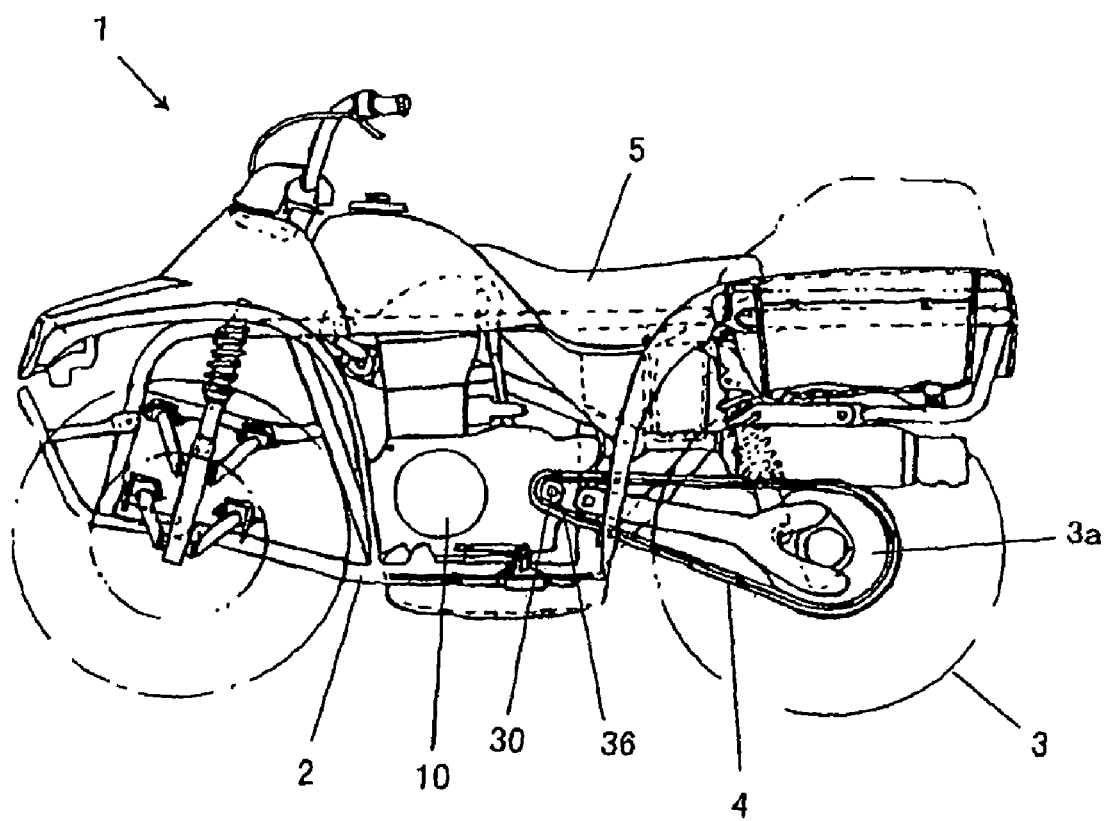
FIG. 1 is a schematic view showing an embodiment of a saddle type vehicle with a forward/reverse travel changeover mechanism according to the present invention.

FIG. 1 is a schematic view showing the embodiment of the saddle type vehicle with a forward/reverse travel changeover mechanism according to the present invention.

As shown in FIG. 1, the saddle type vehicle 1 is a vehicle wherein a driving wheel 3 and an engine 10 for driving the driving wheel 3 through a chain 4 are mounted on a vehicle body frame 2 and a seat 5 for a driver is disposed above the engine 10. It is to be noted that the vehicle shown is a four-wheeled buggy.

Figure 2:
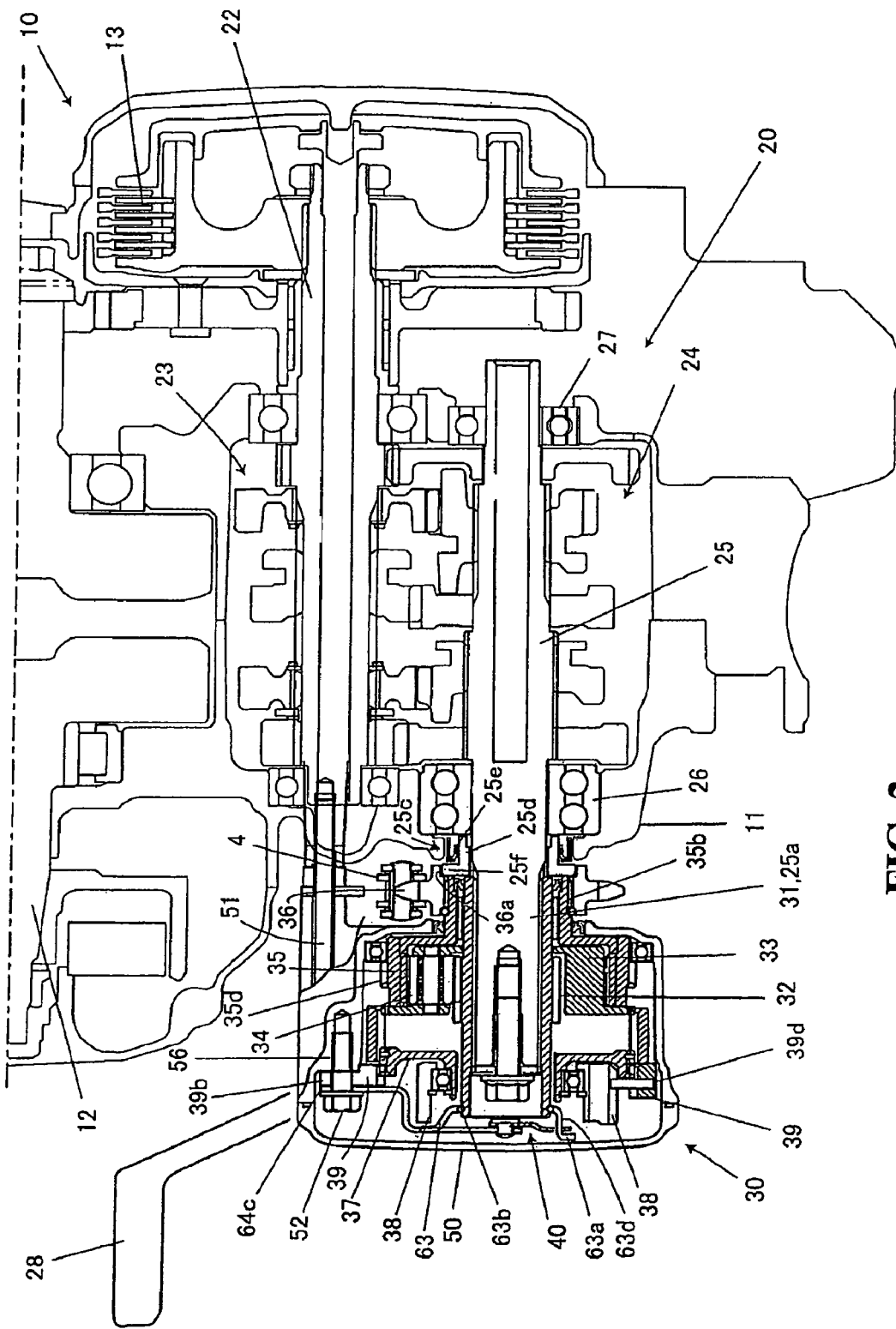
FIG. 2 is a sectional view showing an essential part of an engine 10.

As shown in FIG. 2, the engine 10 includes a main transmission 20 for converting the power from the engine 10 into a variable speed and transmitting the speed into the driving wheel 3, and a sub transmission 30 capable of further shifting the speed or changing the direction of the power from the main transmission 20 and transmitting the power of the converted speed or direction. It is to be noted that, although the sub transmission 30 configures a forward/reverse travel changeover mechanism capable of converting the direction of power from the main transmission 20 and transmitting the power of the converted direction, also it is possible to achieve a configuration wherein the speed of the power from the main transmission 20 is further converted and the power of the converted speed is transmitted by increasing one planetary gear as hereinafter described.

In the following, a general configuration of the sub transmission 30 is described first, and then details of the components are described.

Figure 3:
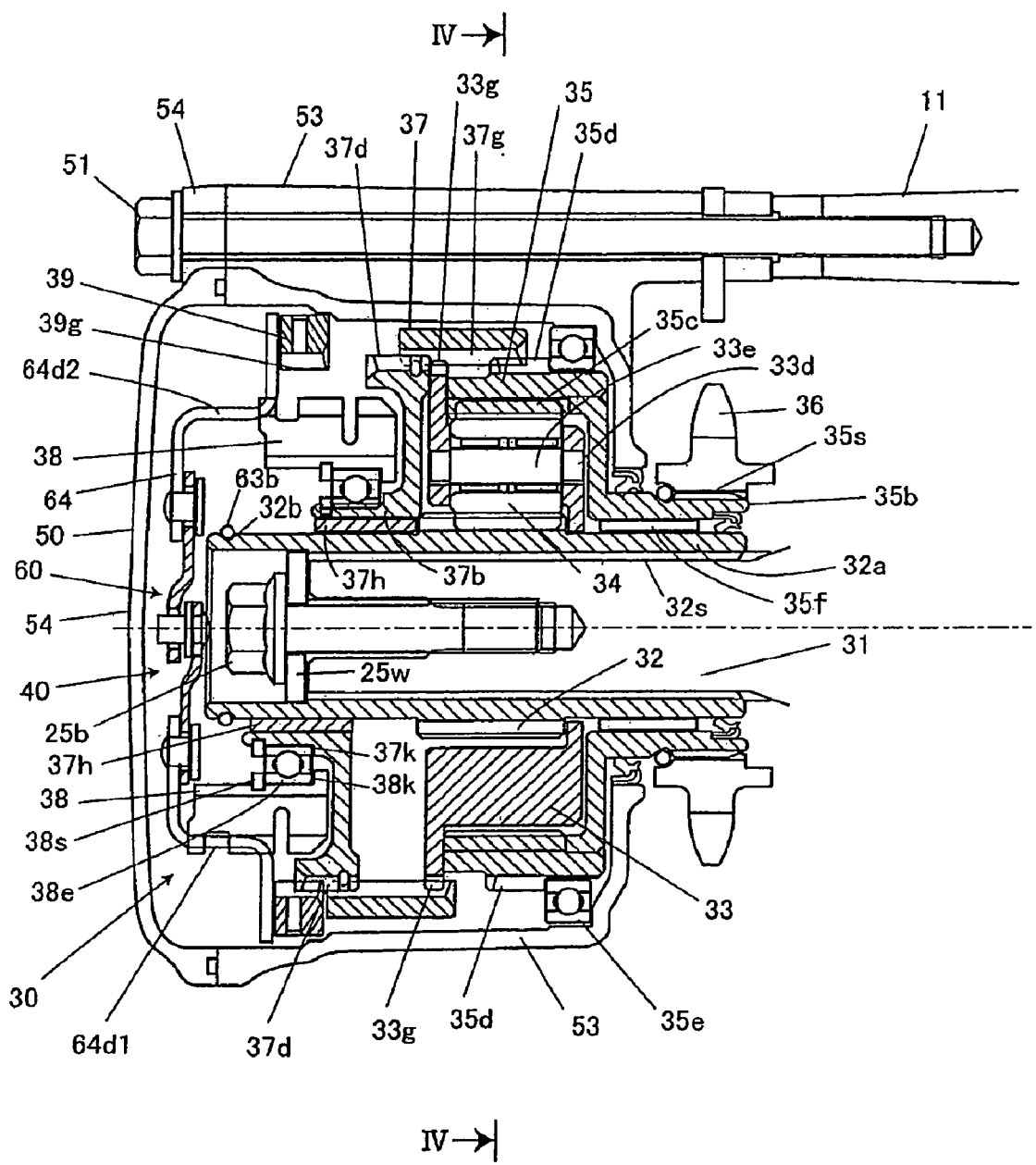
FIG. 3 is an enlarged sectional view of a sub transmission.

As shown principally in FIGS. 2 and 3, the sub transmission 30 which forms the forward/reverse travel changeover mechanism includes an input power shaft 31 for receiving power from the main transmission 20 as input power thereto, output power members 35 and 36 for outputting the power inputted from the input power shaft 31 toward the driving wheel 3, and conversion mechanisms 32 to 35, 37 and 38 disposed between the input power shaft 31 and the output power members 35 and 36 in the power transmission route for transmitting the power transmitted from the input power shaft 31 to the output power members 35 and 36. The input power shaft 31 is formed from a projection 25a by causing an output power shaft 25, which outputs the power from the main transmission 20, to project to the outside of a main transmission case 11 which is a part of an engine case of the engine 10, and the conversion mechanisms 32 to 35, 37 and 38 are disposed only around the projection 25a which is the input power shaft 31 while the output power members 35 and 36 are rotatably supported relative to the input power shaft 31 on the input power shaft 31.

An inhibitor mechanism 40 hereinafter described is provided at an end portion of the projection.

The sub transmission 30 is covered with a sub transmission case 50. The sub transmission case 50 is composed of a case body 53 and a cover 54 and is fixed to the engine case 11 by common tightening by a bolt 51 (FIG. 3). At least part of the sub transmission 30 (in the sub transmission shown, an internal gear 35 and a fixing member 39) is supported on the sub transmission case 50.

The forward/reverse travel changeover mechanism (30) has a planetary gear mechanism and a shift mechanism for selecting operation of the planetary gear mechanism.

The planetary gear mechanism includes a sun gear 32 provided on the input power shaft 31 which is the projection rotatably integrally with the projection 25a, a carrier 33 supported around the projection 25a (hereinafter referred to also as input power shaft 31) rotatably relative to the sun gear 32, a planetary gear 34 supported self-rotatably on the carrier 33 and rotatably held in meshing engagement with the sun gear 32, and an internal gear 35 rotatably supported relative to the input power shaft 31 around the input power shaft 31 and held in meshing engagement with the planetary gear 34.

As shown principally in FIG. 3, the shift mechanism includes a shifter 37 movable along the axial direction of the input power shaft 31 to selectively change over the position of the carrier 33 and the internal gear 35 between a forward travel position in which the carrier 33 and the internal gear 35 are connected against relative rotation and a reverse travel position in which rotation of the carrier 33 around the input power shaft 31 is prevented (the carrier 33 is fixed), and a shift drum 38 for selectively moving the shifter 37 between the forward travel position and the reverse travel position.

The shifter 37 has a boss portion 37b provided thereon, and the shift drum 38 is rotatably supported relative to the shifter 37 on an outer periphery of the boss portion 37b.

It is to be noted that, in FIG. 3, an upper half illustrates a state wherein the shifter 37 and the shift drum 38 are at the forward travel position, and a lower half illustrates another state wherein the shifter 37 and the shift drum 38 are at the reverse travel position.

This forward/reverse travel changeover mechanism (30) has an output sprocket 36. The output sprocket 36 is rotatably supported integrally with the internal gear 35 and movably in the axial direction of the input power shaft 31 by spline fitting and is rotatably supported relative to the input power shaft on the input power shaft 31 adjacent to the main transmission 20 with respect to the sun gear 32. The internal gear 35 forms an output power member of the planetary gear mechanism and cooperates with the output sprocket 36 to form an output power member of the sub transmission 30.

The forward/reverse travel changeover mechanism (30) is disposed outside the main transmission case 11.

Details of the components of the sub transmission 30 are described hereinafter.

As shown in FIG. 2, the input power shaft 31 is formed from an output power shaft of the main transmission 20.

The main transmission 20 has a main shaft 22 to which rotation of a crankshaft 12 of the engine 10 is transmitted through a clutch 13, a plurality of driving speed change gears 23 provided on the main shaft 22, and a countershaft 25 on which a plurality of driven speed change gears 24 for selectively meshing with the plural driving speed change gears 23 are mounted. This countershaft 25 is the output power shaft for outputting power from the main transmission 20, and one end of the countershaft 25 extends to the outside of the engine case 11 and this projection 25a forms the input power shaft 31 of the sub transmission 30 described hereinabove. It is to be noted that the main transmission 20 is a transmission which can change the speed among the neutral and first to fifth speed positions by operating a change pedal 28. Accordingly, also the input power shaft 31 is rotatable at any of the first to fifth speed positions.

The output power shaft 25 of the main transmission 20 is supported by a plurality of bearing members 26 and 27 on the engine case 11, and the projection 25a which is the input power shaft 31 of the sub transmission 30 is held in a cantilever state on the engine case 11. The planetary gear mechanism (32 to 35) and the shift mechanism (37, 38) which are conversion mechanisms are disposed on the tip side of the projection 25a while the output power members 35 and 36 are disposed on the base portion side of the projection 25a. More specifically, on the engine case 11 side and on the main transmission 20 side.

An oil seal portion 25c between the engine case 11 and the projection 25a of the output power shaft 31 has a collar 25d supported on an outer periphery of the output power shaft 31 and a seal member 25e supported on an outer periphery of the collar 25d. A flange 25f is provided on the collar 25d, and an outer circumferential face of the flange 25f can temporarily support a part 36a of an inner circumferential face of the output sprocket 36 which is an output power member.

Where such a configuration as described above is adopted, when the projection 25a is assembled to the sub transmission 30, since the output sprocket 36 can be held concentrically around the projection 25a, the work of assembling a boss portion 35b of the internal gear 35 to the inner circumference of the output sprocket 36 by spline fitting in a state wherein the chain 4 is wrapped around an outer periphery of the output sprocket 36 is facilitated.

Figure 4:
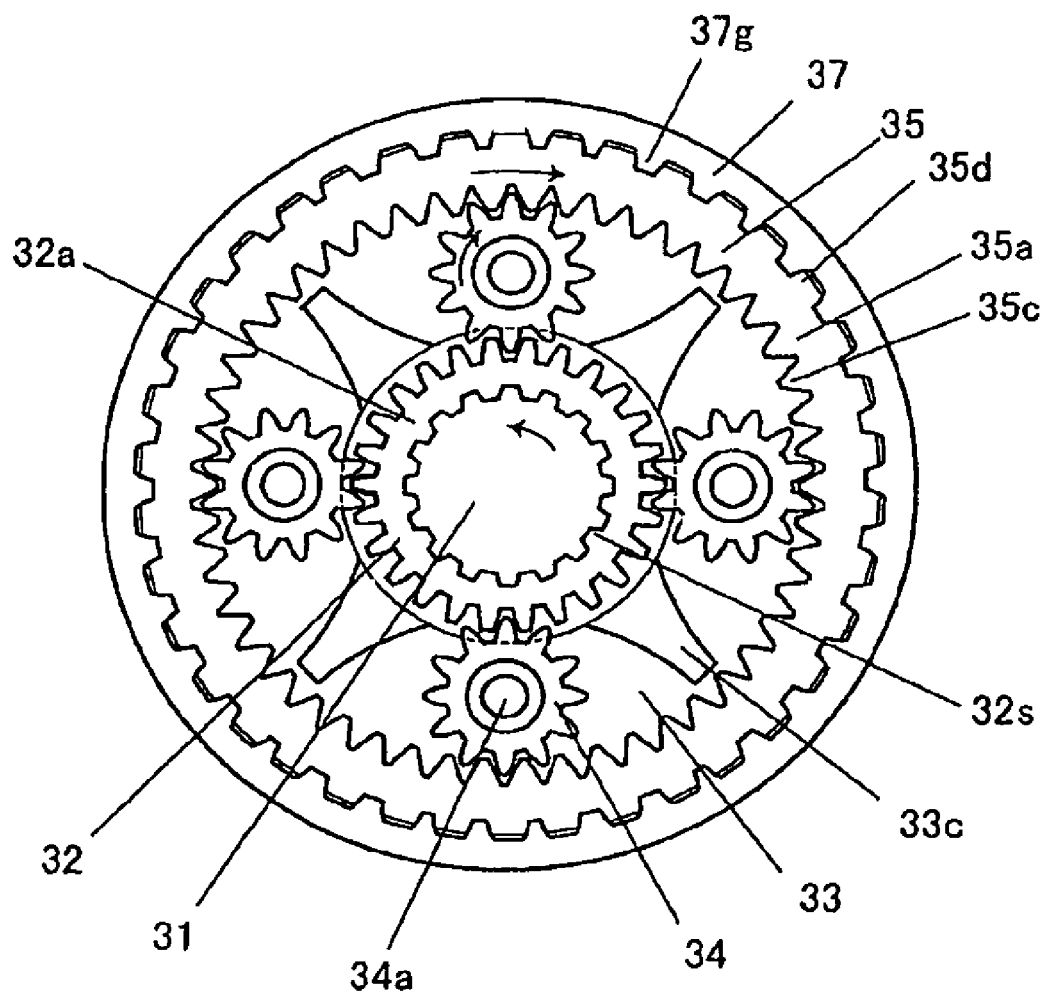
FIG. 4 is a partly omitted sectional view taken along line IV-IV of FIG. 3.

As shown in FIGS. 3 and 4, the sun gear 32 is formed integrally on an outer periphery of a cylindrical member 32a for spline fitting with the projection 25a of the output power shaft 25. The spline 32 is provided.

The sun gear 32 is mounted on the projection 25a from the tip side (left side in FIG. 3) thereof such that the movement of the cylindrical member 32a and the projection 25a in the axial direction is defined by a bolt 25b held in meshing engagement with an axial end of the projection 25a of the shaft in the cylindrical member 32a. It is to be noted that the bolt 25b is screwed through a washer 25w.

Figure 6A:
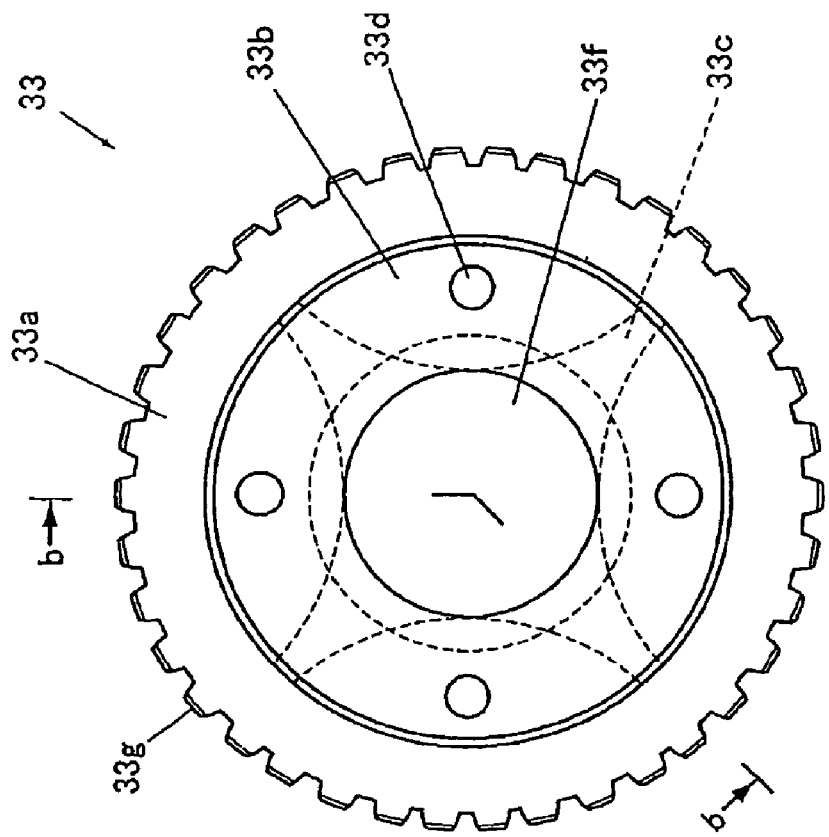
FIGS. 6(a) and 6(b) are views showing a carrier 33, wherein 6(a) is a front elevational view and 6(b) is a sectional view taken along line b-b of FIG. 6(a)
Figure 6B:
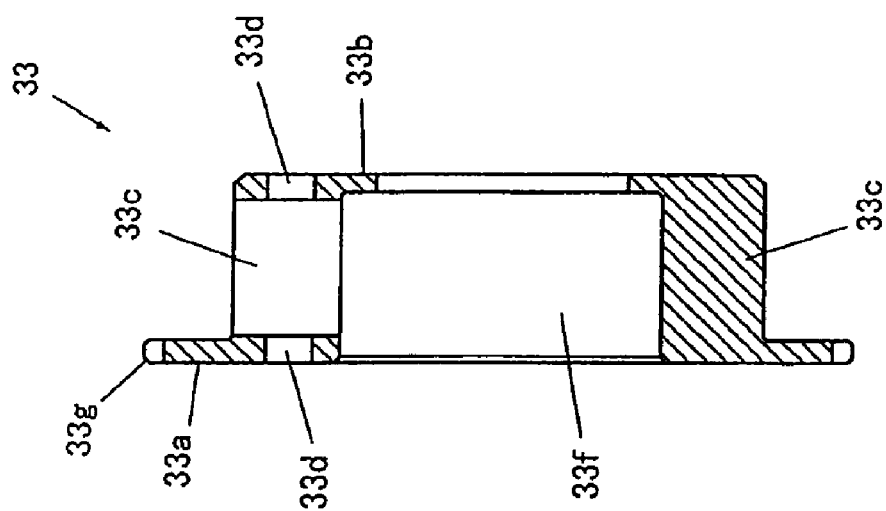

FIGS. 6(a) and 6(b) are views showing the carrier 33, wherein 6(a) is a front elevational view and 6(b) is a sectional view taken along line b-b of FIG. 6(a).

The carrier 33 is formed by integrally connecting two ring-shaped large and small disks 33a and 33b opposing to each other by connection portions 33c at four places. Bearing holes 33d are provided in the disks 33a and 33b between the connection portions 33c in a circumferential direction. As shown in FIG. 3, four planetary gears 34 are rotatably supported on a shaft 33e which is supported at the opposite ends thereof by the bearing holes 33d.

The input power shaft 31 and the sun gear 32 are fitted in a through-hole 33f (FIG. 6(a)) positioned at the center of the carrier 33, and the planetary gear 34 meshes with the sun gear 32 as shown in FIG. 3. It is to be noted that the planetary gear 34 is held in meshing engagement also with the internal gear 35 as seen in FIG. 4.

Teeth 33g are formed on an outer circumferential portion of the disk 33a having a large radius, and teeth 37g of the shifter 37 hereinafter described engage with the teeth 33g. In other words, the teeth 33g are teeth as an engaging portion but do not form a gear wheel.

As shown in FIGS. 3 and 4, the internal gear 35 has a ring portion 35a, and a boss portion 35b integral with the ring portion 35a.

Internal teeth 35c which form a gear wheel are formed on an inner circumferential face of the ring portion 35a, and teeth 35d serving as an engaging portion are formed on an outer circumferential face of the ring portion 35a.

A spline 35s is formed on an outer circumferential face of the boss portion 35b.

As shown in FIG. 3, the cylindrical member 32a of the sun gear 32 is fitted relatively rotatably on an inner periphery of the boss portion 35b through a needle bearing 35f.

The planetary gear 34 meshes with the internal teeth 35c of the ring portion 35a.

The teeth 37g of the shifter 37 hereinafter described can be brought into and out of engagement with the teeth 35d of the ring portion 35a.

The spline 35s of the boss portion 35b engage with a spline provided on an inner circumferential face of the output sprocket 36 mounted on the boss portion 35b.

The internal gear 35 is rotatably supported on the sub transmission case 50 by a bearing member (bearing) 35e provided on an outer circumferential face of the ring portion 35a.

The output sprocket 36 drives the driving wheel 3 through the chain 4 and a driven sprocket 3a, see, FIG. 1.

FIGS. 7(a) and 7(b) are views showing the shifter 37, wherein 7(a) is a front elevational view and 7(b) is a sectional view taken along line b-b of FIG. 7(a).

As shown in the figure and FIGS. 3 and 4, the shifter 37 has a ring portion 37a and a boss portion 37b integral with the ring portion 37a. The shifter 37 is supported relatively rotatably on the cylindrical member 32a of the sun gear 32 through a bush 37h.

The teeth 37g as an engaging portion are formed on an inner circumferential face of the ring portion 37a.

The boss portion 37b has a flange portion 37f, and teeth 37d as an engaging portion are formed on an outer circumferential face of the flange portion 37f.

The ring portion 37a is mounted on an outer circumferential face of the flange portion 37f, and the flange portion 37f (that is, the boss portion 37b) and the ring portion 37a are integrated with each other by a C-clip not shown. When the ring portion 37a is mounted on the outer circumferential face of the flange portion 37f, the teeth 37g and 37d of them mesh with each other.

The teeth 37g of the ring portion 37a are normally held in meshing engagement with the teeth 33g of the carrier 33 described hereinabove.

The shifter 37 can be moved in the axial direction of the input power shaft 31, and by the movement, the teeth 37g of the ring portion 37a are brought into and out of engagement with the teeth 35d of the internal gear 35 and the teeth 37d of the flange portion 37f are brought into and out of engagement with the teeth 39g of a fixing member 39 hereinafter described.

FIGS. 8(a) to 8(d) are views showing the fixing member 39, wherein 8(a) is a front elevational view, 8(b) is a sectional view taken along line b-b of FIG. 8(a), 8(c) is a partial plan view of FIGS. 8(a), and 8(d) is a sectional view taken along line d-d of FIG. 8(a).

As seen in FIGS. 8(a) to 8(d) and FIGS. 3 and 5, the fixing member 39 is a ring-shaped member, and teeth 39g as an engaging portion are formed on an inner circumferential face of the fixing member 39. The teeth 37d of the shifter 37 described hereinabove are brought into and out of engagement with the teeth 39g.

Three mounting portions 39b are provided on an outer circumferential face of the fixing member 39. The fixing member 39 is fixed in the sub transmission case 50 by fastening the mounting portions 39b to the sub transmission case 50 by bolts 52 as shown in FIG. 2.

Holes 39c are provided at upper and lower portions of the fixing member 39, and shift pins 39d as a defining member for defining movement of a shift drum 38 hereinafter described in the axial direction are fixed to the holes 39c.

Further, grooves 39e, 39e for guiding a wire hereinafter described are provided in the fixing member 39. Accordingly, at locations adjacent the grooves 39e, 39e, the teeth 39g are not formed in order to avoid interference with the wire.

FIGS. 9(a) to 9(d) are views showing the shift drum 38, wherein 9(a) is a front elevational view, 9(b) is a sectional view taken along line b-b of FIG. 9(a), 9(c) is a sectional view taken along line c-c of FIGS. 9(a), and 9(d) is a development of a cam face.

As shown in FIGS. 9(a) to 9(d) and FIG. 2, the shift drum 38 has a hollow cylindrical shape and has two cam portions 36a and 38b on an outer periphery thereof, and a lead groove (cam groove) 38c for providing a plurality of positions in the axial direction of the shift drum 38 (in the leftward and rightward direction in FIG. 2) is provided on each of the cam portions. In the present embodiment, as the plural positions, a forward travel position (FWD position in FIG. 9(d)) and a reverse travel position (RVS position in the same figure) are provided.

In the lead grooves 38c, shift pins 39d provided at upper and lower portions of the fixing member 39 are engaged individually (only the lower pin is shown in FIG. 2).

Accordingly, the shift drum 38 can be moved along the axial direction by rotating the shift drum 38.

As shown in FIG. 3, the shift drum 38 is rotatably supported on an outer periphery of the boss portion 37b of the shifter 37 described hereinabove through a bearing member 38e. As illustrated in FIG. 9(c) and FIG. 7(b) a ring groove 38r and 37r for a stopper 38s (FIG. 3) of the bearing member 38e is provided.

The shift drum 38 is coupled to the boss portion 37b of the shifter 37 through the bearing member 38e by the stopper 38s and so forth. In particular, as shown in FIG. 3, movement of the bearing member 38e on one side in the axial direction relative to the shifter 37 and the shift drum 38 is stopped by the stopper 38s, and movement of the bearing member 38e on the other side in the axial direction relative to the shifter 37 and the shift drum 38 is stopped by abutting engagement of a stepped portion 37k (refer to FIGS. 7(a) and 7(b)) formed on the boss portion 37b of the shifter 37 and the shift drum 38 formed on the inner circumferential face of the shift drum 38. Accordingly, the relative movement of the shifter 37 and the shift drum 38 in the axial direction is stopped and they move integrally with each other in the axial direction. In other words, if the shift drum 38 moves in the axial direction, then also the shifter 37 moves in the axial direction integrally with the shift drum 38.

Figures 11A, 11B:
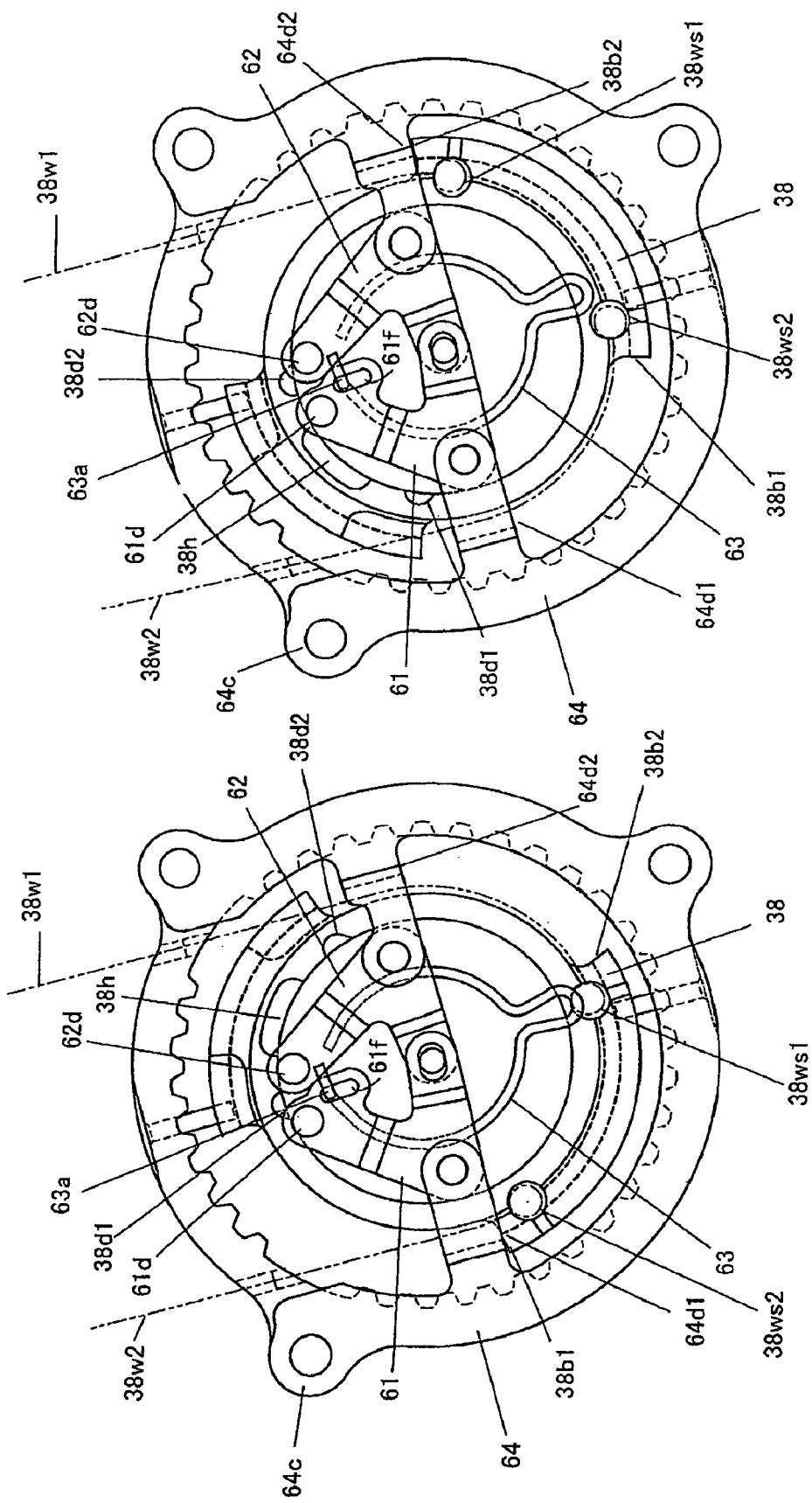
FIGS. 11(a) and 11(b) are explanatory views of operation.

On the cam portion 38b of the shift drum 38, holes 38i and 38j into which cylindrical end portions 38ws1 and 38ws2 fixed to ends of wires 38w1 and 38w2 (refer to FIGS. 11(a) and 11(b)) for rotating the shift drum 38 are fitted to connect the shift drum 38 and the wires to each other.

If the wire 38w1 is pulled in a state wherein the shift drum 38 and the wires 38w1 and 38w2 are connected to each other as shown in FIGS. 11(a) and 11(b), then the shift drum 38 rotates forwardly, but if the wire 38w2 is pulled, then the shift drum 38 rotates reversely. It is to be noted that the forward rotation in the present specification is rotation in the counterclockwise direction in FIGS. 11(a) and 11(b), and the reverse rotation is rotation in the clockwise direction in FIGS. 11(a) and 11(b) (and FIGS. 4 and 5).

The wires 38w1 and 38w2 are connected to a shift lever not shown provided for pivotal motion at a suitable place of the vehicle 1, and if the shift lever is pivoted to the forward travel position, then the wire 38w1 is pulled to rotate the shift drum 38 forwardly, but if the shift lever is pivoted to a reverse travel position, then the wire 38w2 is pulled to rotate the shift drum 38 reversely. It is to be noted that operation of the entire mechanism is hereinafter described.

Figure 5:
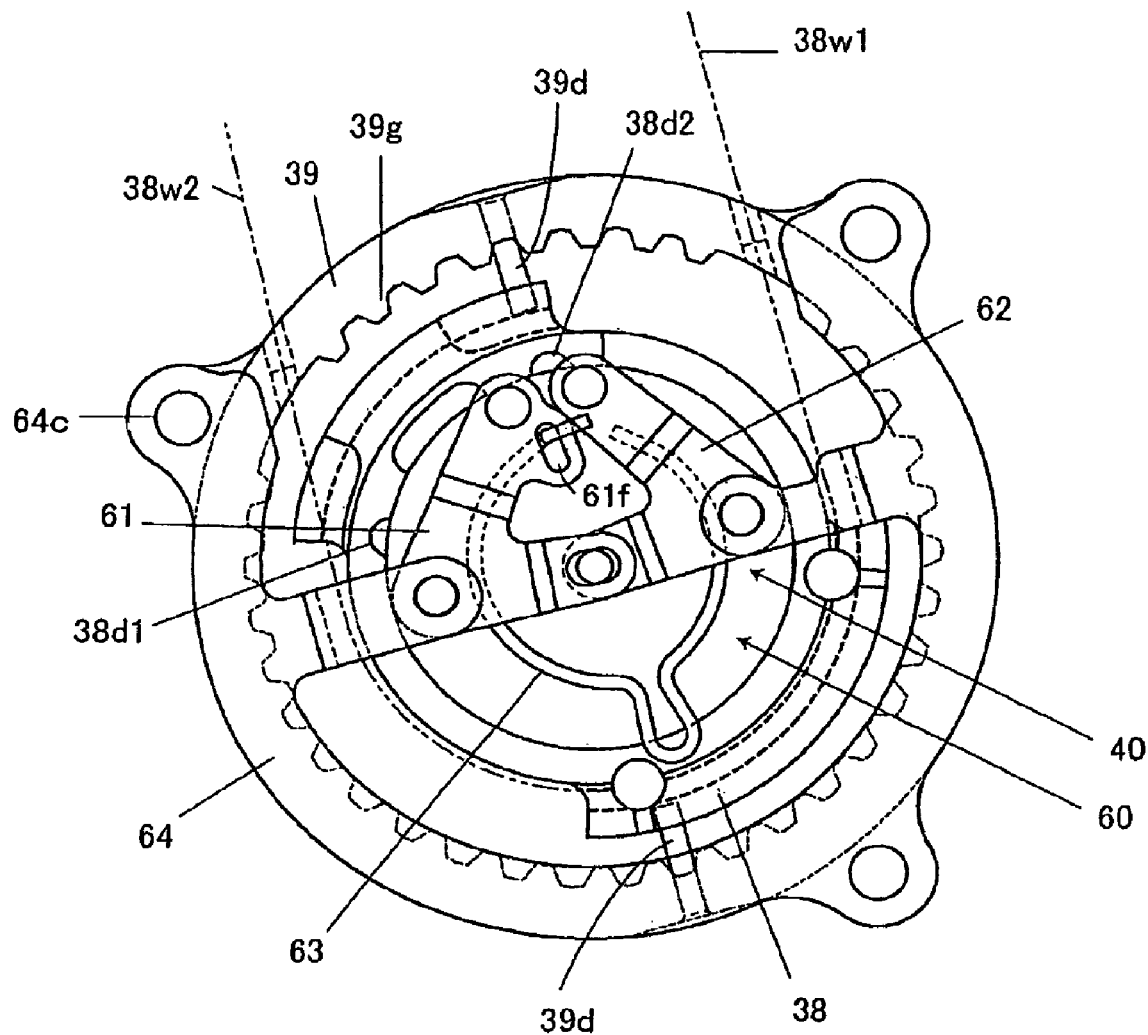
FIG. 5 is a partly omitted left side elevational view of FIG. 3.

As shown in FIGS. 3 and 5, the inhibitor mechanism 40 includes a shaft (input power shaft described hereinabove) 31 for rotatably supporting the shift drum 38 thereon, engaging portions 38d1 and 38d2 provided on an inner circumferential face 38f of the shift drum 38 (refer to FIGS. 9(a) to 9(d)), and a link mechanism 60 which operates in an interlocking relationship with rotation of the shaft 31, which rotatably supports the shift drum 38 thereon, and engages, when the shaft 31 is rotating, with the engaging portion 38d1 or 38d2 of the shift drum 38 to stop both of forward rotation and reverse rotation of the shift drum 38. It is to be noted that, in the present embodiment, the shift drum 38 is rotatably supported on the input power shaft 31 through the boss portion 37b of the shifter 37 and the sun gear 32 as described hereinabove.

Figure 10B:
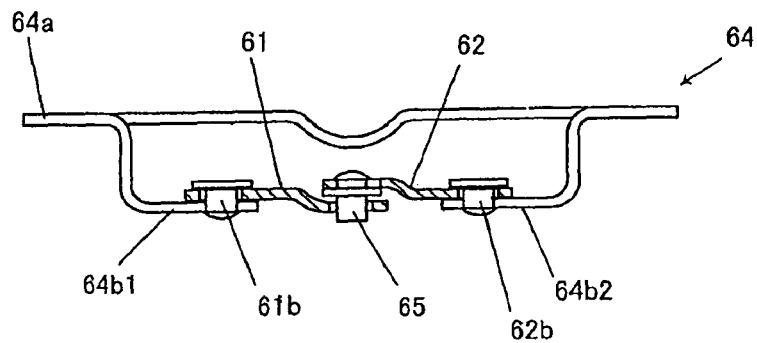
Figure 10B:
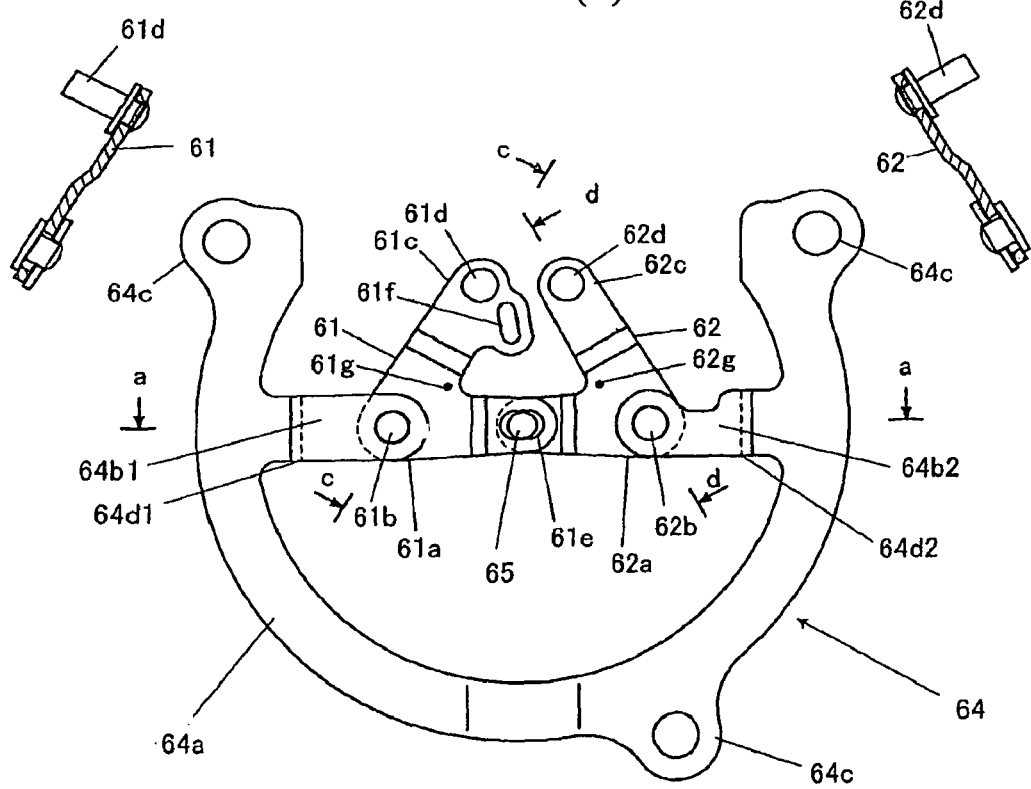

FIGS. 10(a) to 10(d) are views showing the link mechanism 60, wherein 10(a) is a sectional view taken along line b-b of FIG. 10(b), 10(b) is a front elevational view, 10(c) is a sectional view taken along line c-c of FIGS. 10(b), and 10(d) is a sectional view taken along line d-d of FIG. 10(b). In addition, FIGS. 11(a), 11(b), 12(a) and 12(b) are explanatory views of operation.

As shown in FIGS. 11(a), 11(b), 12(a), 12(b) and 3, the link mechanism 60 includes a spring member 63 in the form of a C-ring forcibly fitted for rotation relative to the cylindrical member 32a on an outer periphery of a shaft (in the arrangement shown, the cylindrical member 32a of the sun gear 32 which integrally rotates with the shaft 31). The link mechanism 60 further includes a first arm 61 connected to one end 63a of the spring member 63 and pivoted by the spring member 63, which is rotated in the direction of rotation of the cylindrical member 32a by rotation of the sun gear 32, to allow a first engaging portion 61d thereof, which is engageable with the engaging portion 38d1 of the shift drum 38, to be moved toward the inner circumferential face 38f of the shift drum 38 so that the first engaging portion 61d stops rotation of the shift drum 38 in one direction (in the case of the arrangement shown, in the forward direction (counterclockwise direction)). The link mechanism 60 further includes a second arm 62 pivoted in the opposite direction to that of the first arm 61 in an interlocking relationship with the pivotal motion of the first arm 61 to allow a second engaging portion 62d thereof, which is engageable with an engaging portion 38d2 of the shift drum 38, to be moved toward the inner circumferential face 38f of the shift drum 38 so that the second engaging portion 62d stops pivotal motion of the shift drum 38 in the other direction (in this instance, in the clockwise direction).

Figure 12A:
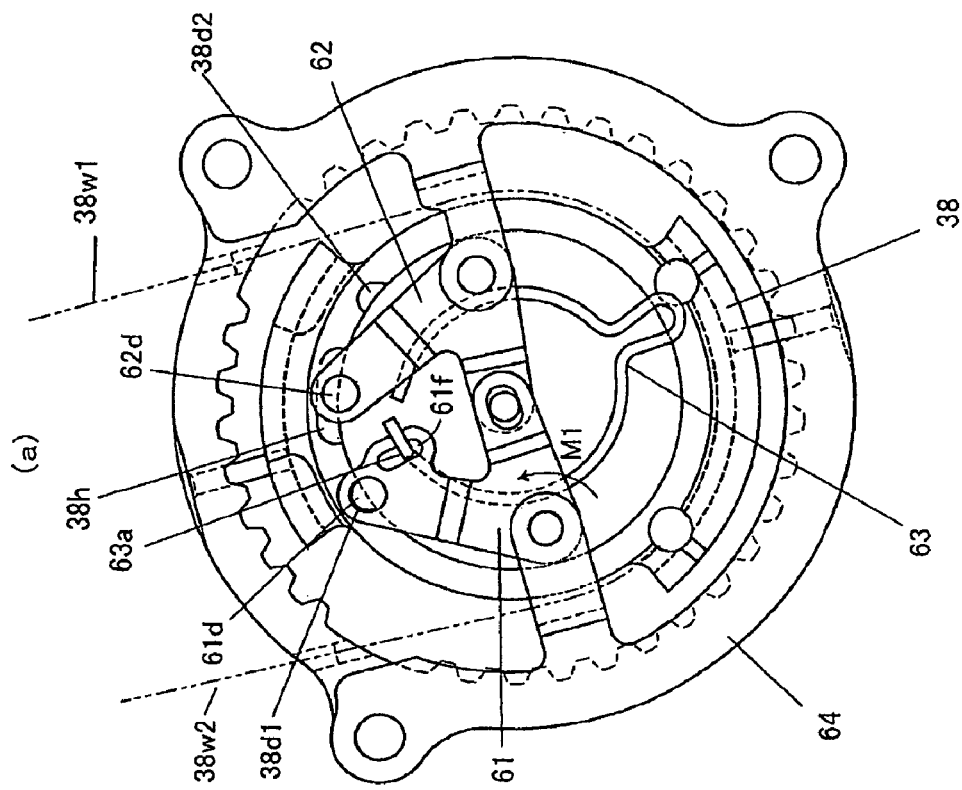
FIGS. 12(a) and 12(b) are explanatory views of operation.
Figure 12B:
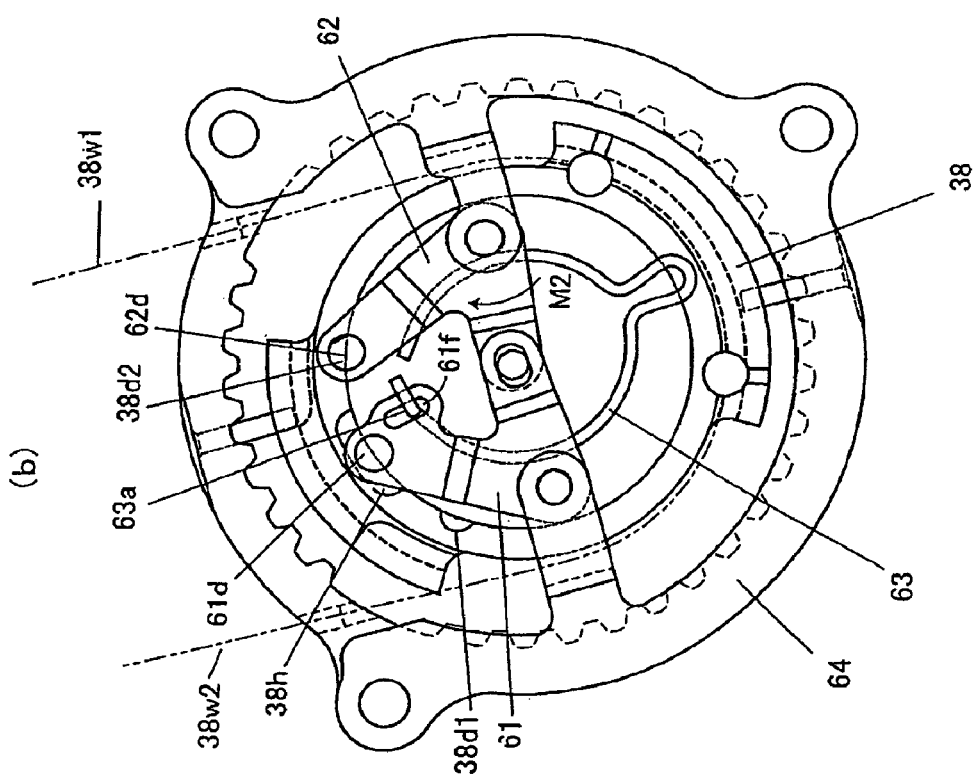

As shown in FIG. 12(a), the direction of the first moment M1 acting upon the first arm 61 is a direction in which the first engaging portion 61d advances toward the inner circumferential face 38f of the shift drum 38. By engagement of the first engaging portion 61d of the first arm 61 with the engaging portion 38d1, the rotation of the shift drum 38 in the counterclockwise direction is stopped. As shown in FIG. 12(b), the direction of the second moment M2 acting upon the second arm 62 is a direction in which the second engaging portion 62d advances toward the inner circumferential face 38f of the shift drum 38. By engagement of the second engaging portion 62d of the second arm 62 with the engaging portion 38d2, the rotation of the shift drum 38 in the clockwise direction is stopped.

Referring to FIGS. 3 and 10(a) to 10(d), a support member 64 for the first and second arms 61 and 62 is provided. The support member 64 has a base plate 64a of a C shape as viewed in plan as seen in FIG. 10(b), and support portions 64b1 and 64b2 are erected to be upright by being bent in a crank shape integrally from the base plate 64a for supporting the arms 61 and 62, respectively, as shown in FIG. 10(a).

Three mounting portions 64c are provided at three different places of the base plate 64a. The base plate 64a is fixed in the sub transmission case 50 by fastening the mounting portions 64c to the sub transmission case 50 by means of bolts 52 together with the mounting portions 39b of the fixing member 39 described hereinabove.

In a state wherein the support member 64 is fixed in the sub transmission case 50, the upright portions 64d1 and 64d2 are positioned on the locus of turning motion of the cam portion 38b of the shift drum 38 as seen in FIGS. 3, 11(a) and 11(b).

As shown in FIG. 11(a), the range of the rotation of the shift drum 38 upon forward rotation is defined by abutment engagement of one end 38b2 of the shift drum 38 with the upright portion 64d2. Meanwhile, as shown in FIG. 11(b), the range of the rotation of the shift drum 38 upon reverse rotation is defined by abutment engagement of the other end 38b1 of the shift drum 38 with the upright portion 63d1.

In other words, the upright portions 64d1 and 64d2 of the support member 64 configure stoppers for defining the range of rotation of the shift drum 38 when the stopping of rotation of the shift drum 38 by the link mechanism is canceled.

As shown in FIG. 10(a) to 10(d), the first arm 61 is an arm of a generally V shape and is pivotably mounted at a base portion 61a thereof on the support portion 64b1 by a pin 61b.

As shown in FIG. 10(a) to 10(d), the second arm 62 is an arm of a generally inverted V shape, and is pivotably mounted at a base portion 62a thereof on the support portion 64b2 by a pin 62b.

The first engaging portion 61d described hereinabove is fixed to one end (tip) 61c of the first arm 61, and the second engaging portion 62d described hereinabove is fixed to one end (tip) 62c of the second arm 62. Both of the first and second engaging portions 61d and 62d are formed from a cylindrical pin member.

An elongated hole 61e is provided at the other end of the first arm 61 and a round hole 62e is provided at the other end of the second arm 62, and the holes 61e and 62e are connected to each other by a pin 65. More specifically, the pin 65 provided on the second arm 62 is held in engagement with the elongated hole 61e of the first arm 61.

Accordingly, pivotal motion of the first arm 61 and pivotal motion of the second arm 62 are interlocked with each other within a range within which the pin 65 can move within the elongated hole 61e. If the first arm 61 is pivoted in the clockwise direction, then the second arm 62 is pivoted in the counterclockwise direction, but if the first arm 61 is pivoted in the counterclockwise direction, then the second arm 62 is pivoted in the clockwise direction.

In a state wherein the first arm 61 and the second arm 62 are connected to each other as shown in FIG. 10(b), the center 61g of gravity of the first arm 61 is disposed at a position at which the first arm 61 is pivoted in a direction in which the first engaging portion 61d thereof is moved away from the inner circumferential face 38f of the shifter 37. Also the center 62g of gravity of the second arm 62 is disposed at a position at which the second arm 62 is pivoted in a direction in which the second engaging portion 62d thereof is moved away from the inner circumferential face 38f of the shifter 37.

As shown FIG. 2, the spring member 63 has a body portion 63b in the form of a C ring, an upright portion 63d bent in a vertical direction from the body portion 63b at the one end 63a of the body portion 63b, and a hook portion 63c bent in a hook shape from the upright portion 63d.

The spring member 63 is rotatably mounted (pressed by resilient force) at the body portion 63b thereof relative to the cylindrical member 32a against a ring groove 32b formed on an outer circumference of the cylindrical member 32a of the sun gear 32 by a resilient force of the spring member 63 itself. The hook portion 63c at the one end 63a of the spring member 63 is fitted in an elongated hole 61f provided at the tip of the first arm 61 as shown in FIG. 11, and the upright portion 63d is held in engagement with the elongated hole 61f of the first arm 61.

Accordingly, if the cylindrical member 32a integral with the input power shaft 31 rotates forwardly, then the spring member 63 is rotated forwardly around the input power shaft 31 (cylindrical member 32a) by the force of friction with the cylindrical member 32a to pivot the first arm 61 in the counterclockwise direction in FIGS. 11(a) and 11(b), and the second arm 62 is pivoted in the clockwise direction in an interlocked relationship with the pivotal motion of the first arm 61. At this time, the first engaging portion 61d of the first arm 61 is engaged with the engaging portion 38d1 of the shift drum 38, or the second engaging portion 62d of the second arm 62 is engaged with the engaging portion 38d2 of the shift drum 38. Thus, the first engaging portion 61d and the second engaging portion 62d continue to be biased toward the inner circumferential face 38f of the shift drum 38 by the spring member 63 thereby to stop the rotation of the shift drum 38. Thereupon, as a result of the pivotal motion of the first arm 61 in the counterclockwise direction, the upright portion 63d of the spring member 63 is positioned in the proximity of the lower end of the elongated hole 61f of the first arm 61 (refer to FIG. 12).

Thereafter, even if the rotation of the input power shaft 31 stops, the upright portion 63d of the spring member 63 remains biasing the first arm 61 in the counterclockwise direction on the inner circumferential face of the elongated hole 61f to keep the first engaging portion 61d in engagement with the engaging portion 38d1.

The inhibitor mechanism 40 having such a configuration as described above operates in the following manner.

In a state wherein the engine 10 stops, or also where the engine 10 is operating, in a state wherein the main transmission 20 is at the neutral position, in short, in a state wherein the input power shaft 31 does not rotate, since the biasing for the first arm 61 by the spring member 63 is not obtained, the first engaging portion 61d of the first arm 61 and the second engaging portion 62d of the second arm 62 do not engage with the engaging portions 38d1 and 38d2 of the shift drum 38, respectively.

Accordingly, the lever described hereinabove can be operated to rotate the shift drum 38 in any of the forward and reverse directions, and any of forward travel and reverse travel hereinafter described can be selected.

On the other hand, in a state wherein the main transmission 20 is operating and the main transmission 20 is in any other position than the neutral position, in short, in a state wherein the input power shaft 31 is rotating, by the biasing for the first arm 61 by the spring member 63 based on rotation of the input power shaft 31, the first engaging portion 61d of the first arm 61 and the second engaging portion 62d of the second arm 62 are biased in a direction in which they are engaged with the engaging portions 38d1 and 38d2 of the shift drum 38, respectively.

Therefore, even if it is tried to operate the lever from the forward travel position shown in FIG. 11(a) to rotate the shift drum 38 in the clockwise direction to establish the state illustrated in FIG. 17(b) in order to select the reverse travel position, within this process, the second engaging portion 62d of the second arm 62 is engaged with the engaging portion 38d2 of the shift drum 38 as seen in FIG. 12(b) to place the inhibitor mechanism 40 into an operative state, in which the speed changing operation of the sub transmission 30 is inhibited.

On the other hand, even if it is tried to operate the lever from the reverse travel position shown in FIG. 11(b) to rotate the shift drum 38 in the counterclockwise direction to establish the state illustrated in FIG. 17(a) in order to select the forward travel direction, within this process, the first engaging portion 61d of the first arm 61 is engaged with the engaging portion 38d1 of the shift drum 38 to place the inhibitor mechanism 40 into an operative state, in which the speed changing operation of the sub transmission 30 is inhibited.

Accordingly, in a state wherein the engine 10 is operating and the main transmission 20 is at any other position than the neutral position, that is, in a state wherein the input power shaft 31 is rotating, operation of the lever described hereinabove is disabled.

Once the inhibitor mechanism 40 is rendered operative, even if the rotation of the input power shaft 31 stops, since the spring member 63 biases the first arm 61 in the counterclockwise direction as described hereinabove, the speed changing operation of the sub transmission 30 remains inhibited.

However, if the driver returns the lever to the original position in the state wherein rotation of the input power shaft 31 stops, then an angular portion 38f1 or 38f2 (refer to FIGS. 9(a) to 9(d)) of the engaging portion 38d1 or 38d2 of the shift drum 38 operates like a cam to push out the first engaging portion 61d or the second engaging portion 62d from the engaging portion 38d1 or 38d2.

In this way, the operation state of the inhibitor mechanism 40 is canceled and the speed changing operation of the sub transmission 30 is enabled.

It is to be noted that, in FIGS. 12(a) and 12(b) and FIGS. 9(a) and 9(b), a recessed portion 38h is provided which allows, when the first arm 61 is pivoted so that the first engaging portion 61*d* thereof is engaged with the engaging portion 38*d*1 of the shift drum 38, the second engaging portion 62*d* of the second arm 62 to escape and allows, when the second arm 62 is pivoted so that the second engaging portion 62*d* thereof is engaged with the engaging portion 38*d*2 of the shift drum 38, the first engaging portion 61*d* of the first arm 61 to escape.

In the following, general operation of the sub transmission 30 is described.

When the Vehicle is to Travel in a Forward Direction

In this instance, in a state wherein the engine 10 stops, or where the engine 10 is operating, in a state wherein the main transmission 20 is placed in the neutral state by the change pedal 28, in short, in a state wherein the input power shaft 31 is not operating, the lever not shown is operated to the forward traveling position to pull the wire 38*w*1 to pivot the shift drum 38 to the forward travel position as shown in FIG. 11(*a*).

Consequently, also the shifter 37 moves to the forward traveling position (refer to the upper side of FIG. 3) thereby to cancel the engagement between the shifter 37 and the fixing member 39 and the teeth 37*g* of the shifter 37 are placed into a state wherein it is engaged with the teeth 33*g* of the carrier 33 and also with the teeth 35*d* of the internal gear 35.

If, in this state, a normal clutch operation or the like is carried out to rotate the input power shaft 31, then the input power shaft 31, sun gear 32, carrier 33 (including the planetary gear 34), internal gear 35 and output sprocket 36 rotate integrally in a direction the same as the direction of rotation of the input power shaft 31.

Accordingly, the vehicle travels in a forward direction.

When the Vehicle is to Travel in a Reverse Direction

In this instance, similarly as in the foregoing description, the input power shaft 31 is placed into a state wherein it does not rotate and the lever not shown is operated in the reverse travel position to pull the wire 38*w*2 as seen in FIG. 11(*b*) to rotate the shift drum 38 in the reverse travel position.

Consequently, also the shifter 37 moves to the reverse travel position (refer to the lower side of FIG. 3), and the shifter 37 and the fixing member 39 are engaged with each other. Further, while the teeth 37*g* of the shifter 37 remain in engagement with the teeth 33*g* of the carrier 33, the engagement with the teeth 35*d* of the internal gear 35 is canceled. In other words, since the carrier 33 is placed into a state wherein it is connected to the fixing member 39 by the shifter 37, the carrier 33 is disabled from rotation around the input power shaft 31.

If, in this state, the input power shaft 31 is rotated by an ordinary clutch operation or the like, then although the input power shaft 31 and the sun gear 32 rotate in the same direction (in the counterclockwise direction in FIG. 4), since the carrier 33 is in a fixed state, the internal gear 35, and hence the output sprocket 36, is rotated reversely (rotated in the clockwise direction) through rotation of the planetary gear 34 as apparent from FIG. 4.

Accordingly, the vehicle travels in a reverse direction.

Figure 13:
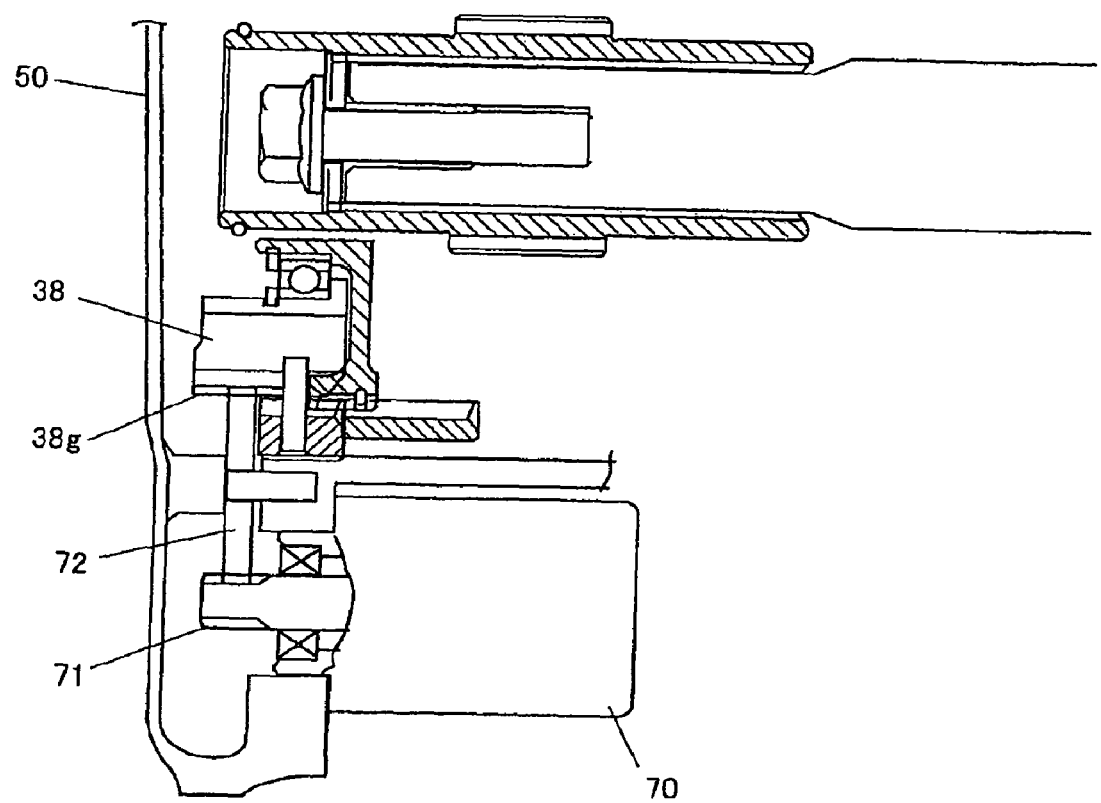
FIG. 13 is a view showing a modification.

FIG. 13 is a view showing a modification.

In this modification, the shift drum 38 is rotated not by a wire but a motor 70.

In the arrangement shown, gear teeth 38*g* are formed directly on the outer periphery of the shift drum 38, and a driving gear 71 of the motor 70 is meshed with the gear teeth 38*g* through an idle gear 72. Thus, the shift drum 38 can be rotated (forwardly or reversely) by driving the motor.

Figure 14:
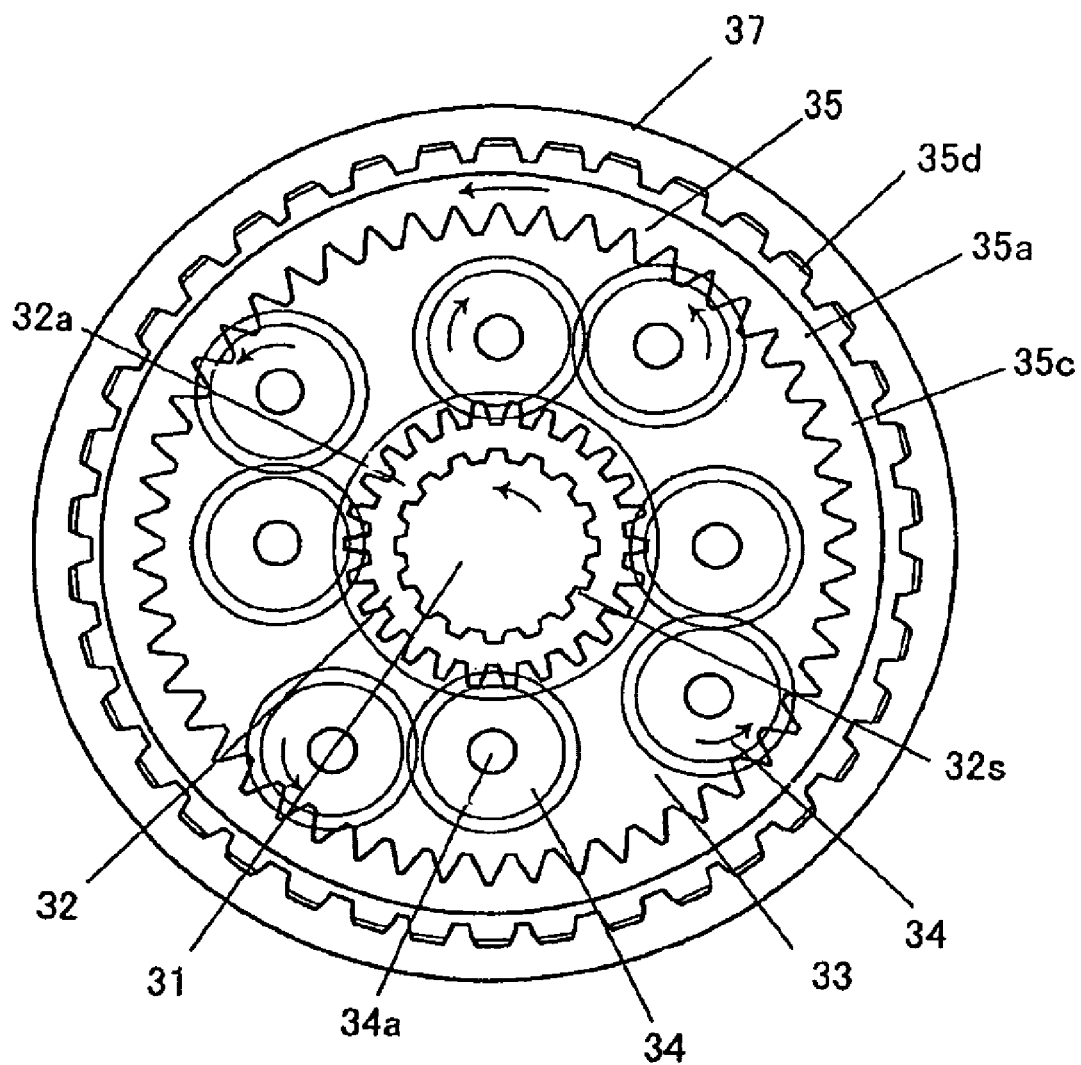
FIG. 14 is a view showing another modification.

While, in the embodiment described above, the sub transmission 30 is formed as a forward/reverse travel changeover mechanism which can reverse the direction of power from the main transmission 20 and transmit the power of the reversed direction, it is possible to add one planetary gear 34 (in the arrangement shown, totaling four planetary gears 34) as shown in FIG. 14 to form a configuration which further converts the speed of the power from the main transmission 20 and transmits the power of the converted speed. For example, it is possible to obtain a super low speed position at which the reduction ratio is higher than that at the first speed (low) of the main transmission 20.

The following operation and effects can be achieved by such a saddle type vehicle with a forward/reverse travel changeover mechanism as described above.

Since the input power shaft 31 is formed from the projection 25*a* obtained by causing the output power shaft 25 for outputting the power from the main transmission 20 to project to the outside of the engine case 11 of the engine and the conversion mechanism is disposed only around the projection 25*a* of the input power shaft while the output member (in the arrangement shown, the internal gear 35 and the output sprocket 36) is rotatably supported relative to the input power shaft 31 on the input power shaft 31, the sub transmission 30 can be formed without providing a shaft different from the input power shaft 31.

Accordingly, the sub transmission 30 itself can be reduced in size, and as a result, the entire engine 10 having the sub transmission can be reduced in size.

(b) Since the output member is formed as an output member including at least the output sprocket 36 and the driving wheel 3 is driven by the output sprocket 36 through the chain 4, the state wherein the output sprocket 36 is disposed on the output power shaft 25 of the main transmission 20 is obtained.

Accordingly, the necessity to change the position of the output power shaft 25 depending upon whether or not the sub transmission 30 is provided on the main transmission 20 is eliminated.

Therefore, the common utility of the member (engine body) on which the sub transmission 30 is not provided can be improved. Accordingly, since the body section of the engine 10 can be used commonly, for example, between a vehicle which includes the sub transmission 30 and another vehicle which does not include the sub transmission 30, the productivity of such vehicles can be improved.

(c) Since the output power shaft 25 is supported by the plurality of bearing members 26 and 27 on the engine case 11 and the projection 25*a* which serves as the input power shaft 31 of the sub transmission 30 is supported in a cantilever state on the engine case 11 while the conversion mechanism is disposed at the free end side of the projection 25*a* and the output power member, particularly, the output sprocket 36, is disposed on the based portion side of the projection 25*a*, the necessity to provide a bearing member at the tip of the projection 25*a* is eliminated and it becomes easy to dispose the conversion mechanism on the tip side of the projection 25*a*. In addition, the load applied from the projection 25*a* can be reduced by disposing the output member, to which a load from the engine side and the driving wheel side is applied, on the base portion side of the projection 25*a*, and therefore, a reduction in the weight of the projection 25*a*, that is, the input power shaft, can be anticipated.

(d) Since the oil seal portion 25*c* between the engine case 11 and the projection 25*a* includes the collar 25*d* disposed on the outer periphery of the output power shaft 25 and the seal member 25*e* disposed on the outer periphery of the collar 25*d* and the part 36*a* of the inner circumferential face of the output sprocket 36 as the output member which is part of the outer circumferential face of the output power shaft 25 can be temporarily supported, upon assembly of the sub transmission 30, the output sprocket 36 which is an output member positioned on the base end side of the projection 25*a* can be temporarily supported by part of the outer circumferential phase of the output power shaft 25.

Accordingly, the assembly performance of the output member and assembly of the sub transmission 30 are improved.

(e) Since the sub transmission 30 is covered with the sub transmission case 50 which is fixed to the engine case 11 and at least part of the sub transmission 30 is supported on the sub transmission case 50, the projection 25*a* supported in a cantilever state can be supported on the engine case 11 by part of the transmission and the sub transmission case.

Accordingly, a further reduction in the weight of the projection 25*a*, that is, the input power shaft 31, can be anticipated.

(f) The forward/reverse travel changeover mechanism includes a projection 25*a* formed by causing an output power shaft 25 for outputting the power from the main transmission 20 to project to the outside of the main transmission case 11 of the engine, the sun gear 32 provided on the projection 25*a* for rotating integrally with the projection 25*a*, the carrier 33 rotatably supported relative to the sun gear 32 around the projection 25*a*, the planetary gear 34 rotatably supported on the carrier 33 and held in meshing engagement with the sun gear 32 for rotation, the internal gear 35 rotatably supported relative to the projection 25*a* around the projection 25*a* and held in meshing engagement with the planetary gear 34, the output sprocket 36 rotatably supported integrally with the internal gear 35 by the internal gear 35 and rotatable around the projection 25*a* adjacent the main transmission 20 with respect to the sun gear 32, and the shifter 37 for selectively changing over the position of the carrier 33 and the internal gear 35 between the forward travel position at which the carrier 33 and the internal gear 35 are connected against relative rotation and the reverse travel position for preventing rotation of the carrier 33 around the projection 25*a*, and the forward/reverse travel changeover mechanism is disposed outside the main transmission case 11. Therefore, not only the necessity to provide a shaft different from the projection 25*a* of the output power shaft of the main transmission 20 is eliminated, but also such effects as described below are achieved.

In particular, since the output sprocket 36 is supported integrally rotatably by the internal gear 35 adjacent the main transmission side with respect to the sun gear 32, the support structure for the output sprocket 36 can be simplified thus the forward/reverse travel changeover mechanism can be further reduced in size. Further, since the forward/reverse travel changeover mechanism is disposed outside the main transmission case 11, the sub transmission 30 can be assembled after the main transmission 20 is assembled to the engine. Therefore, the assembly performance is improved.

(g) Since the internal gear 35, carrier 33, shifter 37 and fixing member 39 which prevents rotation of the carrier 33 through the shifter 37 are disposed in order toward the extension direction of the projection 25*a* and the shifter 37 is mounted for movement along the axial direction of the projection 25*a*, it becomes possible to support the shifter 37 by means of the projection 25*a*. Therefore, the support structure for the shifter 37 can be simplified.

Accordingly, the forward/reverse travel changeover mechanism can be further reduced in size.

(h) Since the boss portion 37*b* is provided on the shifter 37 and the shift drum 38 for moving the shifter 37 is rotatably supported on the outer periphery of the boss portion 37*b* while the fixing member 39 is disposed on the outer periphery of the shift drum 38 and the shift pins 39*d* as a defining member for defining the movement of the shift drum 38 in the axial direction are provided on the fixing member 39, the fixing member 39 can serve also as the defining member. Therefore, the number of parts of the forward/reverse travel changeover mechanism can be reduced.

Since the sun gear 32 is formed integrally on the outer periphery of the cylindrical member 32*a* held in spline meshing engagement with the projection 25*a* and the movement of the cylindrical member 32*a* and the projection 25*a* in the axial direction is defined by the bolt 25*b* screwed at the axial end of the projection 25*a* in the cylindrical member 32*a*, a reduction in the size of the forward/reverse travel changeover mechanism can be anticipated by an amount by which projection of the bolt 25*b* from the cylindrical member 32*a* can be prevented.

Since the shift mechanism includes the shifter 37 which moves along the axial direction of the input power shaft 31 to selectively change over the forward travel position at which the carrier 33 and the internal gear 35 are connected to each other against relative rotation and the reverse travel position for preventing rotation of the carrier 33 around the input power shaft 31 and the shift drum 38 for selectively moving the shifter 37 to one of the forward travel position and the reverse travel position while the boss portion 37*b* is provided on the shifter 37 and the shift drum 38 is rotatably supported relative to the shifter 37 on the outer periphery of the boss portion 37*b*, the shift drum 38 is supported by the shifter 37 which is a component itself of the planetary gear mechanism and the number of parts can be reduced.

Since the lead groove 38*c* having the plurality of positions in the axial direction of the shift drum 38 is formed on the outer periphery of the shift drum 38 and the shift pins 39*d* fixed to the fixing member 39 is provided outwardly in the circumferential direction of the shift drum 38 such that the shift pins 39*d* is engaged with the lead groove 38*c* so that, when the shift drum 38 is rotated, the shift drum 38 is moved along the axial direction of the input power shaft 31, the shift drum 38 can be moved along the axial direction of the input power shaft 31 by a simple configuration.

Since the two wires are connected to different positions in the circumferential direction on the outer periphery of the shift drum 38 such that the shift drum 38 is rotated by the pulling movement of the wires, a reduction in the weight of the forward/reverse travel changeover mechanism can be anticipated.

Where the shift drum 38 is driven by a motor, since the 38*g* are formed directly on the outer periphery of the shift drum 38 and the driving gear 71 of the motor 70 is meshed with the gear teeth 38*g* through the idle gear 72, a reduction in the size of the forward/reverse travel changeover mechanism can be anticipated.

Since the inhibitor mechanism 40 includes the shaft 31 for rotatably supporting the shift drum 38, the engaging portions 38*d*1 and 38*d*2 provided on the inner circumferential face of the shift drum 38, and the link mechanism 60 which operates in an interlocking relationship with rotation of the input power shaft 31 which rotatably supports the shift drum 38 thereon and engages, when the shaft 31 is rotating, with the engaging portion of the shift drum 38 to stop both the forward and the reverse rotation of the shift drum 38, the inhibitor mechanism 40 can operate by rotation of the shaft 31 of the shift drum 38 to stop the rotation of the shift drum 38 in the opposite directions.

The lead groove 38*c* include a plurality of positions in the direction of the axis of rotation of the shift drum 38 that are formed on the outer periphery of the shift drum 38 and the shift pins 39*d* fixed to the fixing member 39 are provided outwardly in the circumferential direction of the shift drum 38 such that the shift pins 39*d* are engaged with the lead groove 38*c* to rotate the shift drum 38 thereby to move the shift drum 38 along the axial direction of the shaft 31. Further, the link mechanism 60 is provided on the fixing member 39, and the stoppers 64*d*1 and 64*d*2 for defining the range of rotation of the shift drum 38 when the stopping of rotation of the shift drum 38 by the link mechanism 60 is canceled are provided on the fixing member 39. According to this configuration, the link mechanism 60 and the stoppers for defining the range of rotation of the shift drum 38 when the stopping of rotation of the shift drum 38 by the link mechanism 60 is canceled are provided on the fixing member 39 to which the shift pins 39*d* is fixed.

Accordingly, the link mechanism 60 and the stoppers 64*d*1 and 64*d*2 with respect to the shift drum 38 can be configured compactly and with high accuracy.

The link mechanism 60 includes the spring member 63 in the form of a C ring pressed against the outer periphery of the shaft 31 rotatably relative to the shaft 31, the first arm 61 connected to one end of the spring member 63 and pivoted by the spring member 63, which is rotated in the direction of rotation of the shaft 31 by rotation of the shaft 31, to allow the first engaging portion 61*d* thereof, which is engageable with the engaging portion of the shift drum 38, to be moved toward the inner circumferential face of the shift drum 38 so that the first engaging portion 61*d* stops rotation of the shift drum 38 in one direction, and the second arm 62 pivoted in the opposite direction to that of the first arm 61 in an interlocking relationship with the pivotal motion of the first arm 61 to allow the second engaging portion 62*d* thereof, which is engageable with the engaging portion of the shift drum 38, to be moved toward the inner circumferential face of the shift drum 38 so that the second engaging portion 62*d* stops pivotal motion of the shift drum 38 in the other direction. Further, the link mechanism 60 is configured such that the direction of the first moment M1 acting upon the first arm 61 by the engagement of the shift drum 38 and the first engaging portion 61*d* is the direction in which the first engaging portion 61*d* advances toward the inner circumferential face 38*f* of the shift drum 38 and the direction of the second moment M2 acting upon the second arm 62 by the engagement of the shift drum 38 and the second engaging portion 62*d* is the direction in which the second engaging portion 62*d* advances toward the inner circumferential face 38*f* of the shift drum 38. Therefore, both the forward rotation and reverse rotation of the shift drum 38 can be stopped with certainty by pivotal motion of the first and second arms 62.

The center 61*g* of gravity of the first arm 61 is disposed at the position at which the first arm 61 is pivoted in the direction in which the first engaging portion 61*d* thereof is moved away from the inner circumferential face 38*f* of the shift drum 38 and the center 62*g* of gravity of the second arm 62 is disposed at the position at which the second arm 62 is pivoted in the direction in which the second engaging portion 62*d* thereof is moved away from the inner circumferential face 38*f* of the shift drum 38. Therefore, such a situation that the first and second arms 61 and 62 are pivoted by the weight of themselves until the first and second engaging portions 61*d* and 62*d* are engaged with the shift drum 38 can be prevented irrespective of whether or not the shaft 31 rotates.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle type vehicle with a forward/reverse travel changeover mechanism in which a driving wheel and an engine for driving said driving wheel through a sprocket are mounted on a vehicle body frame and a seat for a driver is disposed above said engine, comprising:
   a main transmission for changing the speed of power from said engine and transmitting the power of the changed speed to said driving wheel;
   a forward/reverse travel changeover mechanism operatively connected to said main transmission for converting the direction of the power from said main transmission and transmitting the power of the changed direction; and
   said forward/reverse travel changeover mechanism includes:
   a projection formed by causing an output power shaft for outputting the power from said main transmission to project to the outside of a main transmission case of said engine;
   a sun gear provided on said projection for rotating integrally with said projection;
   a carrier rotatably supported relative to said sun gear around said projection;
   a planetary gear self-rotatably supported on said carrier and rotatably mating with said sun gear;
   an internal gear rotatably supported relative to said projection around said projection and mating with said planetary gear;
   an output sprocket rotatably supported integrally with said internal gear by said internal gear, which rotates around said projection adjacent to said main transmission with respect to said sun gear; and
   a shifter for selectively changing over the position of said carrier and said internal gear between a forward travel position at which said carrier and said internal gear are connected against relative rotation and a reverse travel position for preventing rotation of said carrier around said projection;
   said forward/reverse travel changeover mechanism being disposed outside said main transmission case.

2. The saddle type vehicle with a forward/reverse travel changeover mechanism according to claim 1, wherein said internal gear, said carrier, said shifter and a fixing member for preventing rotation of said carrier through said shifter are disposed in order toward the projecting direction of said projection, and said shifter is movably disposed along an axial direction of said projection.

3. The saddle type vehicle with a forward/reverse travel changeover mechanism according to claim 2, wherein a boss portion is provided on said shifter and a shift drum for moving said shifter is rotatably supported on an outer periphery of said boss portion, and said fixing member is disposed on an outer periphery of said shift drum and a defining member for defining the movement of said shift drum in the axial direction is provided on said fixing member.

4. The saddle type vehicle with a forward/reverse travel changeover mechanism according to claim 1, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

5. The saddle type vehicle with a forward/reverse travel changeover mechanism according to claim 2, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

6. The saddle type vehicle with a forward/reverse travel changeover mechanism according to claim 3, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

7. The saddle type vehicle with a forward/reverse travel changeover mechanism according to claim 1, wherein the carrier is formed by integrally connecting two ring-shaped large and small disks opposing to each other at a plurality of connection portions with bearing apertures provided in the large and small disks between the connection portions in a circumferential direction.

8. The saddle type vehicle with a forward/reverse travel changeover mechanism according to claim 1, wherein the sun gear includes a cylindrical member axially extending along an input power shaft, said cylindrical member being spline fitted relative to the input power shaft with a boss portion of the internal gear being relatively rotatably mounted relative to the cylindrical member of the sun gear.

9. The saddle type vehicle with a forward/reverse travel changeover mechanism according to claim 1, wherein the shifter is movable in an axial direction of an input power shaft wherein teeth of a ring portion of the shifter are brought into and out of engagement with teeth of the internal gear and teeth of a flange portion of the shifter are brought into and out of engagement with teeth of a fixing member, said fixing member being a ring-shaped member secured to a sub transmission case.

10. The saddle type vehicle with a forward/reverse travel changeover mechanism according to claim 3, wherein the shift drum includes gear teeth formed directly on an outer periphery of the shift drum and a driving gear of a motor is in mesh with the gear teeth of the shift drum through an idle gear, wherein the shift drum can be rotated in a forward or reverse direction by operating the motor attached to the driving gear.

11. A vehicle with a forward/reverse travel changeover mechanism in which an engine is operatively connected to a driving wheel through a sprocket mounted on a vehicle body frame, comprising:
a main transmission for changing the speed of power from said engine and transmitting the power of the changed speed to said driving wheel;
a forward/reverse travel changeover mechanism operatively connected to said main transmission for selectively converting the direction of the power from said main transmission and transmitting the power of the changed direction; and
said forward/reverse travel changeover mechanism being disposed at a location outside a main transmission case and includes:
an output power shaft:
a projection extending from said output power shaft for outputting the power from said main transmission to said location outside of the main transmission case;
a sun gear provided on said projection for rotating integrally with said projection;
a carrier rotatably supported relative to said sun gear around said projection;
a planetary gear self-rotatably supported on said carrier and rotatably mating with said sun gear;
an internal gear rotatably supported relative to said projection around said projection and mating with said planetary gear;
an output sprocket rotatably supported integrally with said internal gear by said internal gear, which rotates around said projection adjacent to said main transmission with respect to said sun gear; and
a shifter for selectively changing over the position of said carrier and said internal gear between a forward travel position at which said carrier and said internal gear are connected against relative rotation and a reverse travel position for preventing rotation of said carrier around said projection.

12. The vehicle with a forward/reverse travel changeover mechanism according to claim 11, wherein said internal gear, said carrier, said shifter and a fixing member for preventing rotation of said carrier through said shifter are disposed in order toward the projecting direction of said projection, and said shifter is movably disposed along an axial direction of said projection.

13. The vehicle with a forward/reverse travel changeover mechanism according to claim 12, wherein a boss portion is provided on said shifter and a shift drum for moving said shifter is rotatably supported on an outer periphery of said boss portion, and said fixing member is disposed on an outer periphery of said shift drum and a defining member for defining the movement of said shift drum in the axial direction is provided on said fixing member.

14. The vehicle with a forward/reverse travel changeover mechanism according to claim 11, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

15. The vehicle with a forward/reverse travel changeover mechanism according to claim 12, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

16. The vehicle with a forward/reverse travel changeover mechanism according to claim 13, wherein said sun gear is formed integrally on an outer periphery of a cylindrical member for spline fitting with said projection, and the movement of said cylindrical member and said projection in the axial direction is defined by a bolt screwed at an axial end of said projection in said cylindrical member.

17. The vehicle with a forward/reverse travel changeover mechanism according to claim 11, wherein the carrier is formed by integrally connecting two ring-shaped large and small disks opposing to each other at a plurality of connection portions with bearing apertures provided in the large and small disks between the connection portions in a circumferential direction.

18. The vehicle with a forward/reverse travel changeover mechanism according to claim 11, wherein the sun gear includes a cylindrical member axially extending along an input power shaft, said cylindrical member being spline fitted relative to the input power shaft with a boss portion of the internal gear being relatively rotatably mounted relative to the cylindrical member of the sun gear.

19. The vehicle with a forward/reverse travel changeover mechanism according to claim 11, wherein the shifter is movable in an axial direction of an input power shaft wherein teeth of a ring portion of the shifter are brought into and out of engagement with teeth of the internal gear and teeth of a flange portion of the shifter are brought into and out of engagement with teeth of a fixing member, said fixing member being a ring-shaped member secured to a sub transmission case.

20. The vehicle with a forward/reverse travel changeover mechanism according to claim 13, wherein the shift drum includes gear teeth formed directly on an outer periphery of the shift drum and a driving gear of a motor is in mesh with the gear teeth of the shift drum through an idle gear, wherein the shift drum can be rotated in a forward or reverse direction by operating the motor attached to the driving gear.

* * * * *